(12) United States Patent
Barrus et al.

(10) Patent No.: US 8,756,673 B2
(45) Date of Patent: Jun. 17, 2014

(54) TECHNIQUES FOR SHARING DATA

(75) Inventors: John W. Barrus, Menlo Park, CA (US); Tomohiko Sasaki, Tokyo (JP); Jamey Graham, San Jose, CA (US); Sharon Kojima, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 661 days.

(21) Appl. No.: 11/694,327

(22) Filed: Mar. 30, 2007

(65) Prior Publication Data

US 2008/0244721 A1  Oct. 2, 2008

(51) Int. Cl.
*G06F 21/00*  (2013.01)
(52) U.S. Cl.
USPC ............... 726/9; 713/159; 713/160; 713/165; 713/172; 713/176
(58) Field of Classification Search
USPC .............................................. 726/9
See application file for complete search history.

(56) References Cited

U.S. PATENT DOCUMENTS

| | | | |
|---|---|---|---|
| 4,974,878 A | | 12/1990 | Josephson |
| 5,323,465 A | * | 6/1994 | Avarne ........................ 713/184 |
| 5,486,686 A | | 1/1996 | Zdybel et al. |
| 5,490,217 A | * | 2/1996 | Wang et al. ...................... 380/51 |
| 5,590,197 A | | 12/1996 | Chen et al. |
| 5,635,012 A | | 6/1997 | Bellucci et al. |
| 5,694,470 A | | 12/1997 | Jernbacker |
| 5,761,677 A | * | 6/1998 | Senator et al. ........................ 1/1 |
| 5,815,657 A | | 9/1998 | Williams et al. |
| 5,933,829 A | * | 8/1999 | Durst et al. ............................ 1/1 |
| 5,940,507 A | * | 8/1999 | Cane et al. ..................... 713/165 |
| 6,023,682 A | | 2/2000 | Checchio |
| 6,035,290 A | * | 3/2000 | Pintsov ......................... 705/405 |
| 6,108,656 A | | 8/2000 | Durst et al. |
| 6,122,394 A | | 9/2000 | Neukermans et al. |

(Continued)

FOREIGN PATENT DOCUMENTS

EP   869 652 A2   10/1998
EP   1 028 313 A2   8/2000

(Continued)

OTHER PUBLICATIONS

Meher et al., A New Approach to Secure Distributed Storage, Sharing and Dissemination of Digital Image, May 2006, IEEE International Symposium on Circuits and Systems, ISCAS 2006, pp. 373-376.*

(Continued)

*Primary Examiner* — Mohammad L Rahman
*Assistant Examiner* — Kenneth Chang

(57) ABSTRACT

Techniques for sharing data between users in a manner that maintains anonymity of the users. Tokens are generated and provided to users for sharing data. A token comprises information encoding an identifier and an encryption key. A user may use a token to upload data that is to be shared. The data to be shared is encrypted using the encryption key associated with the token and the encrypted data is stored such that it can be accessed using the identifier associated with the token. A user may then use a token to access the shared data. The identifier associated with the token being used to access the shared data is used to access the data and the encryption key associated with the token is used to decrypt the data. Data is shared anonymously without revealing the identity of the users using the tokens.

10 Claims, 12 Drawing Sheets

(56) References Cited

U.S. PATENT DOCUMENTS

| | | | |
|---|---|---|---|
| 6,163,771 A | 12/2000 | Walker et al. | |
| 6,189,009 B1 | 2/2001 | Stratigos et al. | |
| 6,193,155 B1 | 2/2001 | Walker et al. | |
| 6,233,340 B1 | 5/2001 | Sandru | |
| 6,259,367 B1* | 7/2001 | Klein | 340/572.1 |
| 6,330,544 B1 | 12/2001 | Walker et al. | |
| 6,370,514 B1 | 4/2002 | Messner | |
| 6,389,151 B1 | 5/2002 | Carr et al. | |
| 6,390,362 B1 | 5/2002 | Martin | |
| 6,422,462 B1 | 7/2002 | Cohen | |
| 6,526,253 B2 | 2/2003 | Hayashi et al. | |
| 6,574,609 B1 | 6/2003 | Downs | |
| 6,618,078 B1 | 9/2003 | Budrys | |
| 6,628,377 B1 | 9/2003 | Sabatini et al. | |
| 6,744,910 B1 | 6/2004 | McClurg et al. | |
| 6,748,424 B1 | 6/2004 | Usuda | |
| 6,755,341 B1 | 6/2004 | Wong et al. | |
| 6,760,843 B1* | 7/2004 | Carter | 726/10 |
| 6,820,803 B1 | 11/2004 | Browning et al. | |
| 6,831,682 B1 | 12/2004 | Silverbrook et al. | |
| 6,873,430 B2 | 3/2005 | Grasso et al. | |
| 6,917,691 B2 | 7/2005 | Evans et al. | |
| 6,930,803 B1 | 8/2005 | Suzuki | |
| 6,937,989 B2 | 8/2005 | McIntyre et al. | |
| 6,970,573 B2 | 11/2005 | Carr et al. | |
| 6,980,031 B2 | 12/2005 | Fowler | |
| 7,016,524 B2 | 3/2006 | Moore | |
| 7,028,188 B1 | 4/2006 | Moore | |
| 7,080,041 B2 | 7/2006 | Nagel | |
| 7,103,575 B1 | 9/2006 | Linehan | |
| 7,113,925 B2 | 9/2006 | Waserstein et al. | |
| 7,234,801 B2 | 6/2007 | Silverbrook | |
| 7,273,162 B2 | 9/2007 | Baker | |
| 7,308,543 B2 | 12/2007 | Kishi | |
| 7,408,575 B2 | 8/2008 | Kawada | |
| 7,469,824 B1 | 12/2008 | Crews et al. | |
| 7,593,542 B2 | 9/2009 | Abe et al. | |
| 7,599,580 B2 | 10/2009 | King et al. | |
| 7,603,434 B2 | 10/2009 | Svendsen | |
| 7,712,675 B2 | 5/2010 | Balinsky et al. | |
| 7,735,721 B1 | 6/2010 | Ma et al. | |
| 7,797,642 B1 | 9/2010 | Karam et al. | |
| 7,809,156 B2 | 10/2010 | Piersol et al. | |
| 7,865,124 B2 | 1/2011 | Piersol et al. | |
| 7,917,866 B1 | 3/2011 | Karam | |
| 2001/0014878 A1 | 8/2001 | Mitra et al. | |
| 2002/0080387 A1 | 6/2002 | Grasso et al. | |
| 2002/0080959 A1 | 6/2002 | Weller | |
| 2002/0084330 A1 | 7/2002 | Chiu | |
| 2002/0103764 A1 | 8/2002 | Yen et al. | |
| 2002/0116618 A1 | 8/2002 | Muratani | |
| 2002/0143624 A1 | 10/2002 | Catan | |
| 2002/0154930 A1 | 10/2002 | Kawaoka | |
| 2002/0174180 A1* | 11/2002 | Brown et al. | 709/203 |
| 2002/0184494 A1* | 12/2002 | Awadalla | 713/160 |
| 2003/0001016 A1 | 1/2003 | Fraier et al. | |
| 2003/0028543 A1 | 2/2003 | Dusberger | |
| 2003/0037248 A1* | 2/2003 | Launchbury et al. | 713/193 |
| 2003/0069902 A1* | 4/2003 | Narang et al. | 707/203 |
| 2003/0079222 A1 | 4/2003 | Boykin et al. | |
| 2003/0130567 A1 | 7/2003 | Mault et al. | |
| 2003/0135420 A1 | 7/2003 | Culling et al. | |
| 2003/0161475 A1* | 8/2003 | Crumly et al. | 380/280 |
| 2003/0164879 A1 | 9/2003 | Kitagawa | |
| 2003/0223614 A1 | 12/2003 | Robins | |
| 2004/0047000 A1 | 3/2004 | Watanabe et al. | |
| 2004/0135867 A1* | 7/2004 | Schmitt et al. | 347/107 |
| 2004/0143394 A1 | 7/2004 | McIntyre et al. | |
| 2004/0143451 A1 | 7/2004 | McIntyre et al. | |
| 2004/0143552 A1 | 7/2004 | Weichert et al. | |
| 2004/0193571 A1 | 9/2004 | Barrus et al. | |
| 2004/0194026 A1 | 9/2004 | Barrus et al. | |
| 2004/0196490 A1 | 10/2004 | Lapstun et al. | |
| 2004/0200901 A1 | 10/2004 | Lebaschi et al. | |
| 2004/0201676 A1 | 10/2004 | Needham | |
| 2004/0205626 A1 | 10/2004 | Klotz et al. | |
| 2004/0207873 A1* | 10/2004 | Kinjo | 358/1.15 |
| 2004/0224670 A1 | 11/2004 | Hull et al. | |
| 2005/0007624 A1 | 1/2005 | Henry | |
| 2005/0010776 A1* | 1/2005 | Kenen et al. | 713/176 |
| 2005/0013462 A1 | 1/2005 | Rhoads | |
| 2005/0022008 A1 | 1/2005 | Goodman et al. | |
| 2005/0062851 A1 | 3/2005 | Silverbrook et al. | |
| 2005/0085263 A1 | 4/2005 | Kim et al. | |
| 2005/0111034 A1 | 5/2005 | Karasaki et al. | |
| 2005/0114232 A1 | 5/2005 | McIntyre et al. | |
| 2005/0132194 A1 | 6/2005 | Ward | |
| 2005/0171847 A1 | 8/2005 | Ling | |
| 2005/0187792 A1 | 8/2005 | Harper | |
| 2005/0200687 A1 | 9/2005 | Silverbrook et al. | |
| 2005/0200703 A1 | 9/2005 | Kobayashi et al. | |
| 2005/0202804 A1 | 9/2005 | Silverbrook et al. | |
| 2005/0257169 A1 | 11/2005 | Tu | |
| 2005/0258246 A1 | 11/2005 | Wolff et al. | |
| 2005/0286463 A1 | 12/2005 | Matsumoto | |
| 2006/0000900 A1 | 1/2006 | Fernandes et al. | |
| 2006/0012813 A1 | 1/2006 | Lapstun et al. | |
| 2006/0015752 A1 | 1/2006 | Krueger | |
| 2006/0025116 A1 | 2/2006 | Silverbrook et al. | |
| 2006/0047977 A1 | 3/2006 | Hanasaki | |
| 2006/0054702 A1 | 3/2006 | Lei | |
| 2006/0055804 A1 | 3/2006 | Arai et al. | |
| 2006/0056728 A1 | 3/2006 | Silverbrook et al. | |
| 2006/0098900 A1 | 5/2006 | King et al. | |
| 2006/0124722 A1 | 6/2006 | Williams et al. | |
| 2006/0179048 A1 | 8/2006 | Doumuki | |
| 2006/0193004 A1 | 8/2006 | Wasilewski et al. | |
| 2006/0218113 A1 | 9/2006 | Kishi | |
| 2006/0224962 A1 | 10/2006 | Ostojic et al. | |
| 2006/0233358 A1* | 10/2006 | Pradhan et al. | 380/28 |
| 2006/0265590 A1 | 11/2006 | DeYoung et al. | |
| 2006/0288236 A1* | 12/2006 | McCue | 713/193 |
| 2007/0003102 A1 | 1/2007 | Fujii et al. | |
| 2007/0013781 A1 | 1/2007 | Kageyama et al. | |
| 2007/0036470 A1 | 2/2007 | Piersol et al. | |
| 2007/0050696 A1* | 3/2007 | Piersol et al. | 715/500 |
| 2007/0067248 A1 | 3/2007 | Chatte | |
| 2007/0070218 A1 | 3/2007 | Meijer | |
| 2007/0078685 A1 | 4/2007 | Dettinger et al. | |
| 2007/0204162 A1* | 8/2007 | Rodriguez | 713/176 |
| 2007/0229678 A1 | 10/2007 | Barrus et al. | |
| 2007/0230703 A1 | 10/2007 | Barrus et al. | |
| 2007/0233612 A1 | 10/2007 | Barrus et al. | |
| 2007/0233613 A1 | 10/2007 | Barrus et al. | |
| 2007/0234215 A1 | 10/2007 | Graham et al. | |
| 2007/0245882 A1 | 10/2007 | Odenwald | |
| 2008/0086421 A1 | 4/2008 | Gilder et al. | |
| 2008/0107271 A1* | 5/2008 | Mergen | 380/278 |
| 2008/0141117 A1 | 6/2008 | King et al. | |
| 2008/0243702 A1 | 10/2008 | Hart et al. | |
| 2011/0216960 A1 | 9/2011 | VanKirk et al. | |

FOREIGN PATENT DOCUMENTS

| | | |
|---|---|---|
| EP | 1 139 649 A2 | 10/2001 |
| EP | 1 507 262 A1 | 2/2005 |
| EP | 1 583 348 A1 | 10/2005 |
| EP | 1 840 897 A1 | 10/2007 |
| EP | 1840898 A1 | 10/2007 |
| EP | 1883053 A1 | 1/2008 |
| EP | 1975847 A1 | 10/2008 |
| GB | 2417074 A | 2/2006 |
| JP | 58-210779 A | 12/1983 |
| JP | 11-215351 A | 8/1999 |
| JP | 2000-113048 A | 4/2000 |
| JP | 2001-086113 A | 3/2001 |
| JP | 2002-024730 A | 1/2002 |
| JP | 2002-055609 A | 2/2002 |
| JP | 2002-117359 A | 4/2002 |
| JP | 2002-236960 A | 8/2002 |
| JP | 2003-316465 A | 10/2002 |
| JP | 2003-319330 A | 11/2003 |
| JP | 2004-062771 A | 2/2004 |
| JP | 2004-086708 A | 3/2004 |

(56) References Cited

FOREIGN PATENT DOCUMENTS

| | | |
|---|---|---|
| JP | 2004-102562 A | 4/2004 |
| JP | 2004-112644 A | 4/2004 |
| JP | 2005-295564 A | 10/2005 |
| JP | 2006-053851 | 2/2006 |
| JP | 2006-150662 A | 6/2006 |
| JP | 2007-280391 A | 10/2007 |
| JP | 2008-004071 A | 1/2008 |
| JP | 2008/071338 A | 3/2008 |
| JP | 2008/257720 A | 10/2008 |
| WO | WO 98/16884 A1 | 4/1998 |
| WO | WO 01/52473 A1 | 7/2001 |
| WO | WO 02/098671 A2 | 12/2002 |
| WO | WO 2006/021383 A1 | 3/2006 |

OTHER PUBLICATIONS

Lange et al., "Insight Lab: An Immersive Team Environment Linking Paper, Displays, and Data," Proceedings of the 1998 Conference on Human Factors in Computing Systems, 1998, 8 pages.

Internet Archive Wayback Machine archive of "How Computers Work: The CPU and Memory," available at URL: http://web.archive.org/web/20031215230244/http://homepage.cs.uri.edu/faculty/wolfe/book/Readings/Reading04.htm, archived on Dec. 15, 2003, 7 pages.

Nelson et al., "Palette: A Paper Interface for Giving Presentations," Proceedings of the CHI Conference on Human Factors in Computing Systems, May 1999, 8 pages.

Non-Final Office Action for U.S. Appl. No. 11/396,375, mailed on Feb. 22, 2010, 15 pages.

Final Office Action for U.S. Appl. No. 11/396,381, mailed on Dec. 22, 2009, 21 pages.

Non-Final Office Action for U.S. Appl. No. 11/608,409, mailed on Jan. 6, 2010, 31 pages.

Non-Final Office Action for U.S. Appl. No. 11/495,613, mailed on Dec. 31, 2009, 39 pages.

Non-Final Office Action for U.S. Appl. No. 11/396,375, Mailed Mar. 5, 2009, 12 pages.

Non-Final Office Action for U.S. Appl. No. 11/396,379, Mailed Dec. 24, 2008, 10 pages.

Non-Final Office for U.S. Appl. No. 11/694,076, Mailed Oct. 29, 2008, 21 pages.

Final Office Action for U.S. Appl. No. 11/694,076, Mailed Apr. 24, 2009, 24 pages.

Requirement for Restriction/Election for U.S. Appl. No. 11/396,379, mailed Nov. 13, 2008, 6 pages.

Non-Final Office Action for U.S. Appl. No. 11/396,379, mailed Jun. 10, 2009, 12 pages.

Non-Final Office Action for U.S. Appl. No. 11/396,381, mailed Jun. 24, 2009, 24 pages.

Requirement for Restriction/Election for U.S. Appl. No. 11/694,076, mailed Sep. 5, 2008, 6 pages.

Extended European Search Report in European Application No. 07113300.3-1228, Mailed Dec. 12, 2007, 5 pages.

Extended European Search Report of Jul. 28, 2008 in European Application No. 08251133.8-2212.

"2 Dimensional Bar Code", Internet Archive Wayback Machine, archived on Jan. 24, 2002, 11 pages, at URL: http://web.archive.org/web/20020124190457/www.adams1.com/pub/russadam/stack.html.

Requirement for Restriction/Election for U.S. Appl. No. 11/495,613, mailed on Oct. 13, 2009, 6 pages.

Final Office Action for U.S. Appl. No. 11/396,375, mailed on Sep. 1, 2009, 16 pages.

U.S. Appl. No. 11/694,076, filed Mar. 30, 2007, Hart et al.

Datacard® SP60 Card Printer, product brochure by Datacard Group (2004).

Communication Pursuant to Rule 44a EPC, dated Jun. 28, 2007, received in related European Application No. 07251463.-2223 (10 pages).

Communication Pursuant to Rule 44a EPC, dated Aug. 7, 2007, received in related European Application No. 07105208.8-2223 (8 pages).

Hull et al., "Visualizing Multimedia Content on Paper Documents: Components of Key Frame Selection for Video Paper," *Proc. 7th Int. Conf. on Document Analysis and Recognition*, 4 pages (2003).

MP Mini Printers Series, LowpowerUltra-Compact Printer, product brochure by APS, revision 3.0 (Sep. 2004).

Nelson et al., "Palette: A Paper Interface for Giving Presentations," *Proceeding of CHI '99 Conf. on Human Factors in Computing Systems* ACM Press, pp. 354-361 (1999).

Newton-Dunn et al., "Block Jam," *SIGGRAPH 2002*, held in SAn Antonio, TX (2002).

Newton-Dunn et al., "Block Jam: A Tangible Interface for Interactive Music," *J. New Music Research*, 32(4):383-393 (2003).

Olympus & Polaroid digital printing camera: Digital Photography Review, downloaded from http://www.dpreview.com/news/0007/00072502c211zoom.asp on Apr. 5, 2007.

Rekimoto et al., "Data Tiles: A Modular Platform for Mixed Physical and Graphical Interactions," *Proceedings of SIGCHI '01*, Mar. 31 to Apr. 4, 2001, Seattle WA.

Sokoler et al., "Physically Embodied Video Snippets Supporting Collaborative Exploration of Video Material During Design Sessions," *Proceedings of NordCHI*, Oct. 19-23, 2002, held in Arhus Denmark (2002).

Ullmer et al., "mediaBlocks: Tangible Interfaces for Online Media," *Proceedings of CHI '99*, May 15-20, 1999.

Non-Final Office Action for U.S. Appl. No. 11/396,264, mailed on Oct. 29, 2009, 16 pages.

Advisory Action for U.S. Appl. No. 11/396,375, mailed on Nov. 18, 2009, 3 pages.

Final Office Action for U.S. Appl. No. 11/396,379, mailed on Dec. 15, 2009, 14 pages.

Non-Final Office Action for U.S. Appl. No. 11/694,076, mailed on Nov. 2, 2009, 18 pages.

"Exchangeable image file format for digital still cameras: Exif Version 2.2," JEITA CP-3451, Standard of Japan Electronics and Information Technology Industries Association, Apr. 2002, pp. 1-148.

White, "How Computers Work," Millennium Edition, Copyright 1999, 37 pages.

Notice of Allowance for U.S. Appl. No. 11/495,613, mailed on Jul. 1, 2010, 18 pages.

Non-Final Office Action for U.S. Appl. No. 11/396,264, mailed on Aug. 4, 2010, 5 pages.

Final Office Action for U.S. Appl. No. 11/396,375, mailed on Aug. 2, 2010, 213 pages.

Final Office Action for U.S. Appl. No. 11/608,409, mailed on Jun. 9, 2010, 23 pages.

Final Office Action for U.S. Appl. No. 11/694,076, mailed on May 10, 2010, 17 pages.

Final Office Action for U.S. Appl. No. 11/396,264, mailed on Mar. 31, 2010, 6 pages.

Non-Final Office Action for U.S. Appl. No. 11/396,379, mailed on Mar. 26, 2010, 17 pages.

Non-Final Office Action in commonly owned U.S. Appl. No. 11/608,409 mailed on Nov. 16, 2011, 18 pages.

Office Action in commonly owned Japanese Application No. 2007-096738 dated Oct. 4, 2011, 3 pages.

Final Office Action in commonly owned U.S. Appl. No. 12/860,176 mailed on Dec. 23, 2011, 34 pages.

Office Action in related Japanese application No. 2007-197790 dated Feb. 7, 2012, 6 pages.

Office Action in related Japanese application No. 2007-095183 dated Feb. 28, 2012, 3 pages.

Advisory Action in commonly owned U.S. Appl. No. 12/860,176 mailed on Mar. 8, 2012, 3 pages.

Erol et al. Prescient Paper: "Multimedia Document Creation with Document Image Matching" 17th International Conference on Pattern Recognition (2004), pp. 1-4.

Gormish et al. "An E-Writer for Documents Plus Strokes" ACM doc Eng (2009), pp. 1-4.

Piersol, K. "Object Oriented Spreadsheets" ACM OOPSLA Proceedings (1986), pp. 1-6.

(56) References Cited

OTHER PUBLICATIONS

Office Action in commonly owned Japanese Application No. 2007-197788 dated Jul. 26, 2011, 2 pages.
Non-Final Office Action in commonly owned U.S. Appl. No. 12/860,176 mailed on Jul. 15, 2011, 30 pages.
Final Office Action for U.S. Appl. No. 11/608,409 mailed on Jun. 8, 2012, 21 pages.
Advisory Action for U.S. Appl. No. 11/608,409 mailed on Aug. 31, 2012, 3 pages.
Non-Final Office Action for U.S. Appl. No. 12/860,176 mailed on Aug. 15, 2012, 32 pages.
U.S. Appl. No. 12/860,176, filed Aug. 20, 2010, Piersol et al.
Final Office Action for U.S. Appl. No. 11/396,264, mailed on Feb. 8, 2011, 15 pages.
Office Action in related Japanese application No. 2008-086838 dated Nov. 13, 2012, 2 pages.
How Computers Work, Millennium Edition. White, Ron. Que Publishing, Indianapolis, 1999. ISBN 0-7897-2112-0, 31 pages.
Exchangeable Image File Format for Digital Still Cameras: Exif Version 2.2. Japan Electronics and Information Technology Industries Association (JEITA). Prepared by: Technical Standardization Committee on AV & IT Storage Systems and Equipment, Apr. 2002, 154 pages.
Non-Final Office Action for U.S. Appl. No. 11/396,375 mailed on Mar. 1, 2013, 17 pages.
Notice of Allowance for U.S. Appl. No. 12/860,176 mailed on Mar. 19, 2013, 8 pages.
Notice of Allowance for U.S. Appl. No. 11/608,409 mailed on Oct. 8, 2013, 9 pages.
Non-Final Office Action for U.S. Appl. No. 11/396,381 mailed on Nov. 22, 2013, 12 pages.
Office Action in related Japanese Application No. 2008-086838 dated Jun. 25, 2013, 2 pages.
Notice of Allowance for U.S. Appl. No. 11/396,375 mailed on Jul. 9, 2013, 15 pages.

\* cited by examiner

TECHNIQUES FOR SHARING DATA

BACKGROUND OF THE INVENTION

The present invention relates to data sharing, and more particularly to techniques for sharing data between multiple users in an anonymous and simple manner.

There are times when it is convenient for two people to arrange a future, secure (and perhaps anonymous) exchange of data. Several conventional techniques may be used for data exchange such as storing the data on a portable memory medium (e.g., a CD, a memory stick) and sending the memory medium to one or more people using mail, attaching an encrypted data file to an email and communicating the email to the intended recipients, uploading secure data to an ftp site, to name a few. However, each of the existing techniques is deficient in one way or another. Either it is not anonymous, requires a non-trivial exchange of detailed information, or requires some setup effort in advance of the exchange.

In light of the above, simplified techniques are desired that enable exchange of data between users wherein the anonymity of the users is maintained.

BRIEF SUMMARY OF THE INVENTION

Embodiments of the present invention provide techniques for sharing data between users in a manner that maintains anonymity of the users. Tokens are generated and provided to users for sharing data. A token comprises information encoding an identifier and an encryption key. A user may use a token to upload data that is to be shared. The data to be shared is encrypted using the encryption key associated with the token and the encrypted data is stored such that it can be accessed using the identifier associated with the token. A user may then use a token to access the shared data. The identifier associated with the token being used to access the shared data is used to access the data and the encryption key associated with the token is used to decrypt the data. Data is shared anonymously without revealing the identity of the users using the tokens.

According to an embodiment of the present invention, techniques are provided for sharing data. In one embodiment, an identifier is generated, wherein the identifier is usable to access data to be shared. An encryption key is generated that can be used for encrypting data to be shared. A set of one or more tokens is generated, each token in the set comprising the identifier and the encryption key, wherein a token from the set of tokens enables storing data such that the data is accessible using any token from the set of tokens. In one embodiment, as part of generating the identifier, a storage location may be determined for storing the data to be shared and the identifier may be generated based upon the storage location. In one embodiment, a machine-readable-code may be generated encoding the identifier and the encryption key and the machine-readable code is associated with each token in the set of tokens.

A token from the generated set may then be used to upload information to be shared. In one embodiment, an identifier and encryption key from a first token in the set of tokens. Information may also be received identifying first data to be shared. The first data is encrypted using the encryption key obtained from the first token to produce encrypted first data and the first encrypted data is stored such that the encrypted first data is accessible using the identifier.

A token from the set of tokens may also be used to access the shared data. In one embodiment, an identifier and encryption key is obtained from a token in the set of tokens that is presented for accessing the shared data. The encrypted first data is accessed using the identifier obtained from the token. The encrypted first data is then decrypted using the encryption key obtained from the token to produce decrypted first data. Access to the decrypted first data is enabled. In this manner, a token holder may use a token to access the shared data.

The tokens that are generated and used may be digital (electronic) tokens or physical tokens. A physical token may be generated by printing the token on a physical medium. In one embodiment, a set of tokens may be generated by printing the set of tokens on a physical medium, wherein the physical medium enables a token printed on the physical medium to be physically separated from other tokens printed on the physical medium.

According to another embodiment of the present invention, techniques are provided for sharing data. In one embodiment, information is received identifying first data to be shared. An identifier and an encryption key are generated. The first data is encrypted using the encryption key to produce encrypted first data. The encrypted first data is stored such that the encrypted first data is accessible using the identifier. A set of one or more tokens is generated, each token in the set comprising the identifier and the encryption key. A generated token may then be used to access the shared data. In one embodiment, a first token may be presented for accessing shared data. Information may be obtained from the first token. An identifier and encryption key may be determined from the information obtained from the first token. The encrypted first data may be accessed using the identifier obtained from the first token and decrypted using the encryption key obtained from the first token to produce decrypted first data. Access to the decrypted first data may be enabled.

According to an embodiment of the present invention, different versions of the shared data may be stored and accessed. In one embodiment, a first record may be stored having first metadata associated with it. A first identifier may be generated, wherein the first record is accessible using the first identifier. An encryption key may be generated, wherein the encryption key is usable for encrypting data to be shared. A set of one or more tokens may be generated, each token in the set comprising the first identifier and the encryption key, wherein a token from the set of tokens enables storing data such that the stored data is accessible using any token from the set of tokens.

A token may then be used to store versions of data to be shared. In one embodiment, a first identifier and the encryption key is obtained from a token from the set of tokens. Information is received identifying first data to be shared. The first data is encrypted using the encryption key to produce encrypted first data. The encrypted first data is stored in a second record, wherein second metadata is associated with the second record. A second identifier is generated wherein the second record is accessible using the second identifier. The second identifier is stored in the first metadata associated with the first record. The second metadata may be encrypted using the encryption key obtained from the token.

The shared data may then be accessed using a token. In one embodiment, a first identifier and encryption key are obtained from a token in the set of tokens. The first record is accessed using the first identifier. The second identifier is determined from the first metadata associated with the first record. The second record is accessed using the second identifier. The encrypted first data in the second record is decrypted using the encryption key to produce decrypted first data. Access to the decrypted first data is enabled.

A token may also be used to store another version of data to be shared. In one embodiment, the first identifier and the encryption key are obtained from a token used for uploading the data to be shared. Information is received identifying second data. The second data is encrypted using the encryption key to produce encrypted second data. The encrypted second data is stored in a third record, wherein third metadata is associated with the third record. A third identifier is generated wherein the third record is accessible using the third identifier. The third identifier is stored in the second metadata associated with the second record.

A token may be used to access the last uploaded shared data. In one embodiment, the first identifier and the encryption key are obtained from a token in the set of tokens. The first record is accessed using the first identifier. The second identifier is determined from the first metadata associated with the first record. The second record is accessed using the second identifier. The third identifier is determined from the second metadata associated with the second record. The third record is accessed using the third identifier. The encrypted second data in the third record is decrypted using the encryption key to produce decrypted second data. Access to the decrypted second data is enabled.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
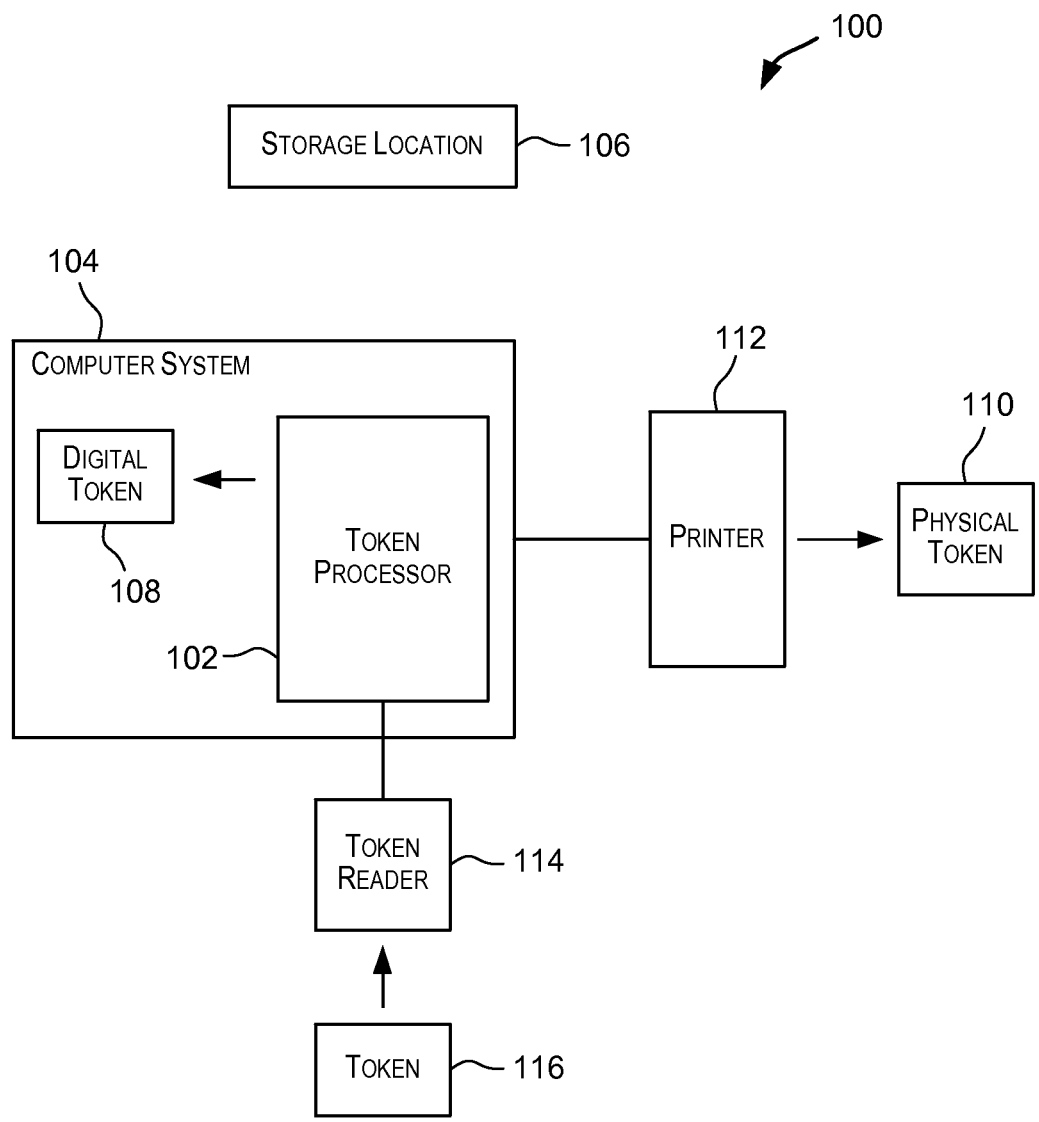
FIG. 1 is a simplified block diagram of a system for generating and using tokens according to an embodiment of the present invention.

Embodiments of the present invention provide techniques for sharing data between multiple users in a manner that maintains anonymity of the users. According to an embodiment of the present invention, one or more tokens are generated that facilitate the sharing of data. FIG. 1 is a simplified block diagram of a system 100 for generating and using tokens according to an embodiment of the present invention. System 100 depicted in FIG. 1 is merely illustrative of an embodiment of the present invention and does not limit the scope of the invention as recited in the claims. One of ordinary skill in the art would recognize other variations, modifications, and alternatives.

As depicted in FIG. 1, system 100 comprises a token processor 102 that facilitates generation and use of tokens according to an embodiment of the present invention. Token processor 102 may be implemented in software (code or instructions executed by a processor), hardware, or combinations. For example, as depicted in FIG. 1, token processor 102 may be an application executing on a computer system 104. The software code or instructions of module 102 may be executed by a processor of system 104.

Figure 2:
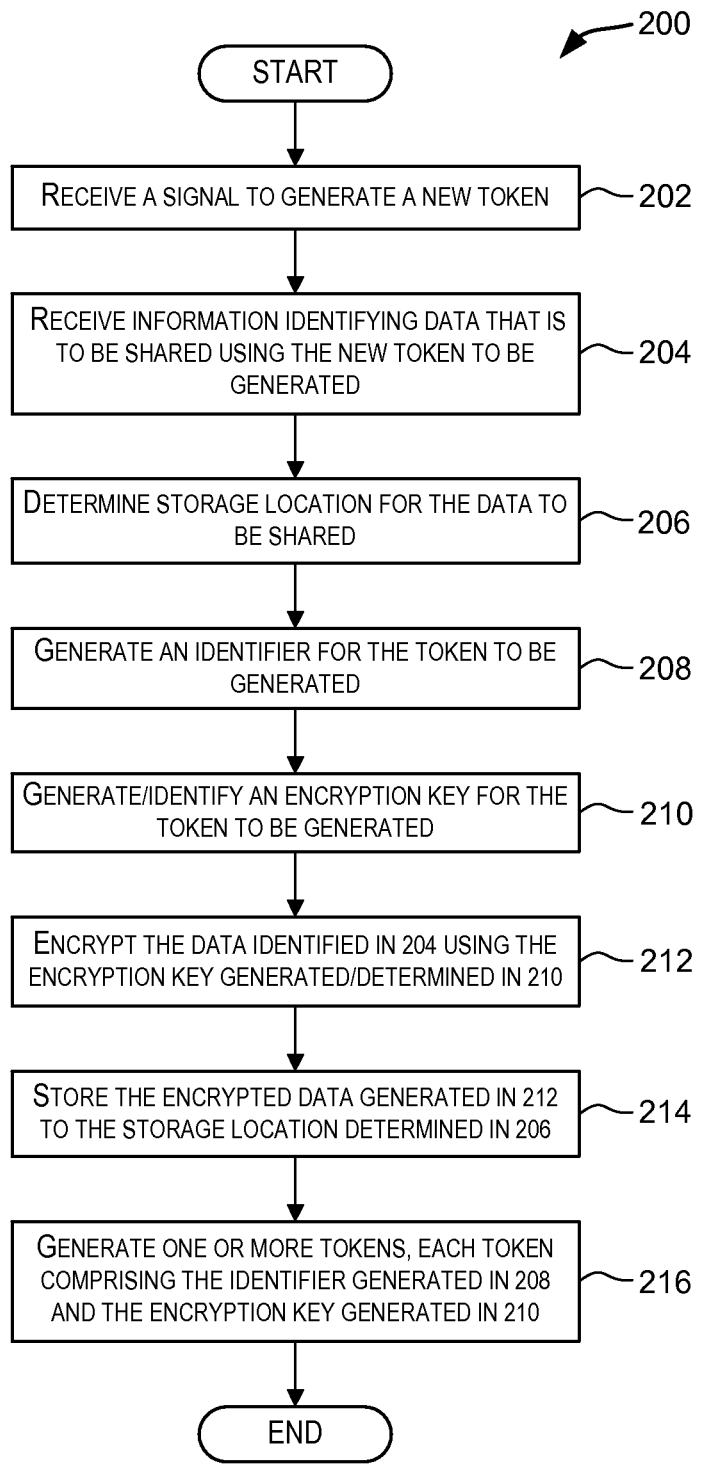
FIG. 2 is a simplified high-level flowchart depicting a method of generating a token according to an embodiment of the present invention.

Token processor 102 is configured to generate tokens according to the teachings of the present invention. The tokens may be generated in response to requests received by token processor 102 from users to generate one or more tokens. In one embodiment, a user may request a new token to be generated and also at the same time identify the data that is to be shared using the token. In response, token processor 102 is configured to perform processing that generates the token. FIG. 2 is a simplified high-level flowchart 200 depicting a method of generating a token according to an embodiment of the present invention. The method depicted in FIG. 2 may be performed by software modules (code modules or instructions) executed by a processor, hardware modules, or combinations thereof. For example, the method may be performed by token processor 102 depicted in FIG. 1. Flowchart 200 depicted in FIG. 2 is merely illustrative of an embodiment of the present invention and is not intended to limit the scope of the present invention. Other variations, modifications, and alternatives are also within the scope of the present invention. The method depicted in FIG. 2 may be adapted to work with different implementation constraints.

Processing may be initiated upon receiving a signal to generate a new token (step 202). Along with a request to generate a new token, information is also received identifying the data that is to be shared using the new token to be generated (step 204). Token processor 102 may provide user interfaces that enable a user to request generation of a new token and also to identify the data that is to be shared.

A storage location for storing the data to be shared is then determined (step 206). If the storage location does not already exist then a storage location may be created as part of 206. For example, as depicted in FIG. 1, a storage location 106 may be determined for storing the data to be shared. The storage location may be local to computer system 104 or may be remote to computer system 104.

An identifier is then generated for the token to be generated (step 208). The generated identifier is such that it can be used to access the shared data from the storage location identified in 206. The identifier may encapsulate information that may be used to determine the storage location where the shared data is stored (i.e., the storage location determined in 206) and also the data stored at that storage location. Examples of an identifier include a pointer or reference to the storage location, an index to the storage location, a URL, and the like. In one embodiment, a globally unique identifier is generated. Various different techniques such as calculating a cryptographic hash of the data, etc. may be used to generate the unique identifier. For example, in one embodiment, the shared data may be encrypted and stored as a document in the storage location, and the identifier that is generated is a globally unique identifier that identifies the document including its storage location.

A unique encryption key is then generated/identified for the token to be generated (step 210). In one embodiment, the encryption key is a symmetric encryption key which can be used to encrypt data and also to decrypt the encrypted data. The data identified in 204 is then encrypted using the encryption key determined in 210 to produce encrypted data (step 212). Various different encryption technologies may be used for encrypting the data. The encrypted data generated in 212 is then stored to the storage location identified in 206 (step 214).

One or more token are generated (step 216). Each generated token comprises information including the identifier generated in 208 and the encryption key generated in 210 that is used to encrypt the shared data. Different techniques may be used to associate the identifier and the encryption key with the generated token. In one embodiment, the identifier and the encryption key may be printed on the token. In another embodiment, the identifier and the encryption key may be encoded in a machine-readable code that is printed on the generated token. Examples of machine-readable codes that may be used to encode the information include barcodes such as a QR code, glyphs, and the like. In one embodiment, the identifier and encryption key may be encoded into two separate machine-readable codes, for example, two separate barcodes. The token may then comprise the two separate barcodes.

The token generated in 216 may be a digital (electronic) token or a physical token. For example, as depicted in FIG. 1, token processor 102 may generate a digital token 108 that may be stored in a memory of computer system 104. Digital token 108 may be an image comprising information encoding the identifier and the encryption key. Digital token 108 may be electronically communicated (e.g., email) and may be displayable on an output device such as a screen, monitor, visual display, etc. A physical token may be generated using a physical medium such as paper, card, plastic, etc. For example, in system 100 depicted in FIG. 1, a physical token 110 may be generated using a printer 112. Token processor 102 may be configured to send token-related information to printer 112 which may then generate physical token 110 by printing the information on a physical medium such as paper, card, plastic, etc. One or more physical tokens may be generated.

In the processing depicted in FIG. 2 and described above, the data to be shared was identified along with the request to generate a token. In alternative embodiments, tokens may be generated without knowledge of the data to be shared. For example, a token may be generated without the data to be shared being identified. The data to be shared may not even be created or available at the time of generating a token that is to be used for sharing the data. A previously generated (pre-generated) token may then subsequently be used to store the data to be shared.

Figure 3:
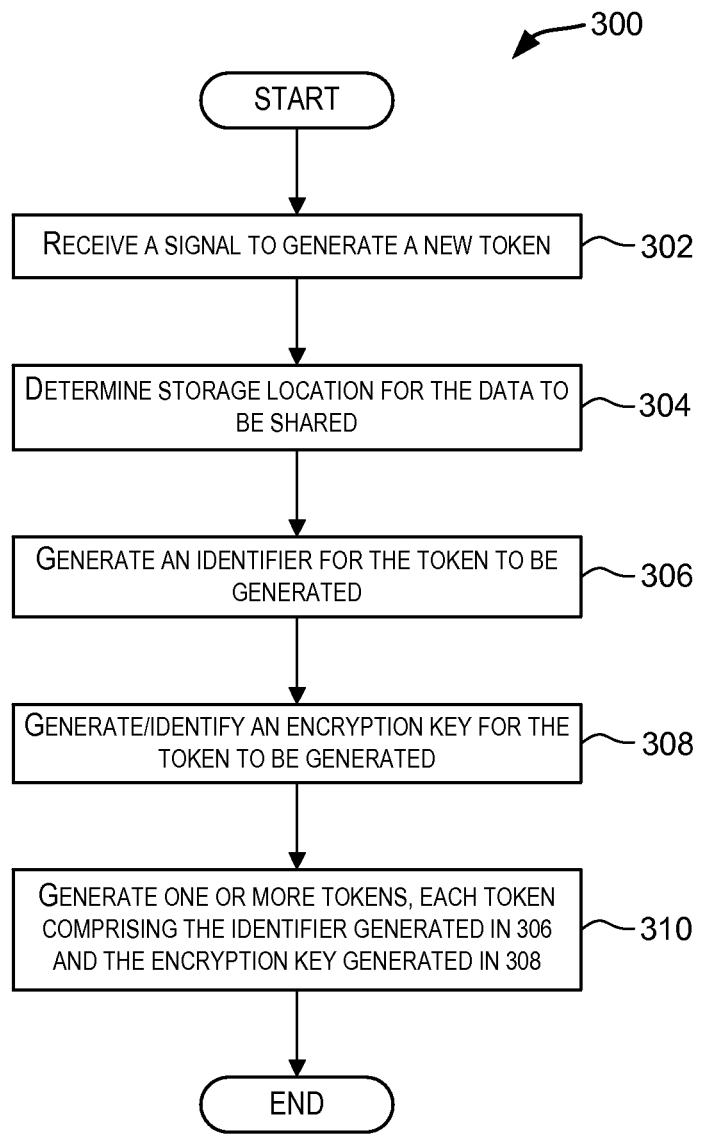
FIG. 3 is a simplified high-level flowchart depicting a method of generating a token without identifying the data that is to be shared using the token according to an embodiment of the present invention.

FIG. 3 is a simplified high-level flowchart 300 depicting a method of generating a token without identifying the data that is to be shared using the token according to an embodiment of the present invention. The method depicted in FIG. 3 may be performed by software modules (code modules or instructions) executed by a processor, hardware modules, or combinations thereof. For example, the method may be performed by token processor 102 depicted in FIG. 1. Flowchart 300 depicted in FIG. 3 is merely illustrative of an embodiment of the present invention and is not intended to limit the scope of the present invention. Other variations, modifications, and alternatives are also within the scope of the present invention. The method depicted in FIG. 3 may be adapted to work with different implementation constraints.

Processing may be initiated upon receiving a signal to generate a new token (step 302). A storage location is then determined (step 304). The storage location determined in 304 represents the location where data to be shared using the token being generated will be stored. If the storage location does not already exist then a storage location may be created as part of 304. In this manner, a memory location is identified for data storage. The storage location may be local to computer system 104 or in some remote location.

An identifier is then generated for the token to be generated (step 306). The generated identifier is such that it can be used to locate the shared data from the storage location determined in 304. Examples of an identifier include a pointer or reference to the storage location, an index to the storage location, a URL, and the like. In one embodiment, a unique identifier is generated. Various different techniques such as calculating a cryptographic hash, etc. may be used to generate the unique identifier.

A unique encryption key is then created for the token to be generated (step 308). In one embodiment, the encryption key is a symmetric encryption key which can be used to encrypt data and also to decrypt the encrypted data.

One or more tokens are then generated (step 310). Each generated token comprises information including the identifier generated in 306 and the encryption key determined in 308 that will be used to encrypt the data being shared. Different techniques may be used to associate the identifier and the encryption key with the token such as printing the identifier and the encryption key on the token, encoding the identifier and the encryption key in a machine-readable code that is printed on the generated token, and the like. A token generated in 310 may be a digital (electronic) token or a physical token.

Figure 4:
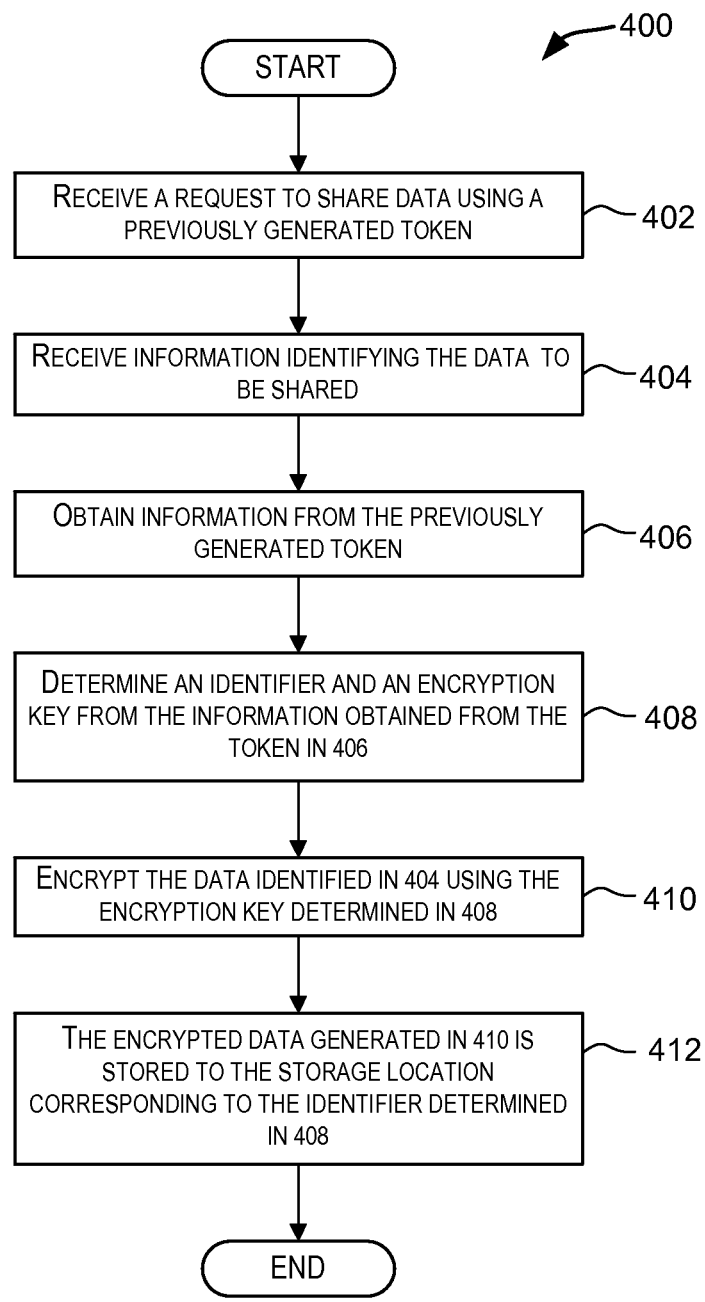
FIG. 4 is a simplified high-level flowchart depicting a method of using a previously generated token to share data according to an embodiment of the present invention.

As described above, a token may be generated even prior to the data to be shared being identified. A previously generated token (either digital or physical) may then subsequently be used to encrypt and store the data to be shared. FIG. 4 is a simplified high-level flowchart 400 depicting a method of using a previously generated token to share data according to an embodiment of the present invention. The method depicted in FIG. 4 may be performed by software modules (code modules or instructions) executed by a processor, hardware modules, or combinations thereof. For example, the method may be performed by token processor 102 depicted in FIG. 1. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints.

As depicted in FIG. 4, processing may be initiated upon receiving a request to share data using a previously generated token (step 402). For example, token processor 102 depicted in FIG. 1 may receive a signal from a user that data is to be shared using a previously generated token. Information may be received identifying the data that is to be shared (step 404). As previously indicated, token processor 102 may provide interfaces that enable a user to specify the data to be shared.

Information is then obtained from the previously generated token that is to be used for sharing the data (step 406). Various different techniques may be used for obtaining information from the previously generated token. In one embodiment, as depicted in FIG. 1, a token reader 114 may be provided that is configured to obtain the information from a previously generated token 116 presented to reader 114. Token 116 may be a digital or physical token. The information obtained from token 116 includes the identifier and the encryption key associated with the token.

Token reader 114 may be capable of obtaining information from a physical token or a digital token. In the case of a digital token, token reader 114 may be configured to capture information from a digital token displayed on a display such as a screen, monitor, a visual display, etc. In one embodiment, image processing or optical character recognition techniques may be used to obtain information from a digital token. In the case of a physical token, reader 114 may be configured to read information from the physical token. As previously described, in one embodiment, the identifier and encryption key may be encoded in a machine-readable code that is associated with a digital or physical token. In this embodiment, token reader 114 may be a barcode reader that is configured to scan and read the machine-readable code printed on the physical token.

An identifier and an encryption key are then determined from the information obtained from the token in 406 (step 408). The encryption key may be a symmetric encryption key.

The data identified in 404 is then encrypted using the encryption key determined in 408 to produce encrypted data (step 410). The encrypted data generated in 410 is then stored to the storage location corresponding to the identifier determined in 408 (step 412) such that the identifier may be used to retrieve the stored data. In this manner, a pre-generated token may be used to encrypt and load information to a storage location from where it can be accessed by one or more users. The data stored in the storage location is then available for access by other users with whom data is to be shared using a token that has the same identifier and the same encryption key as the token that was used to upload the shared data.

Figure 5:
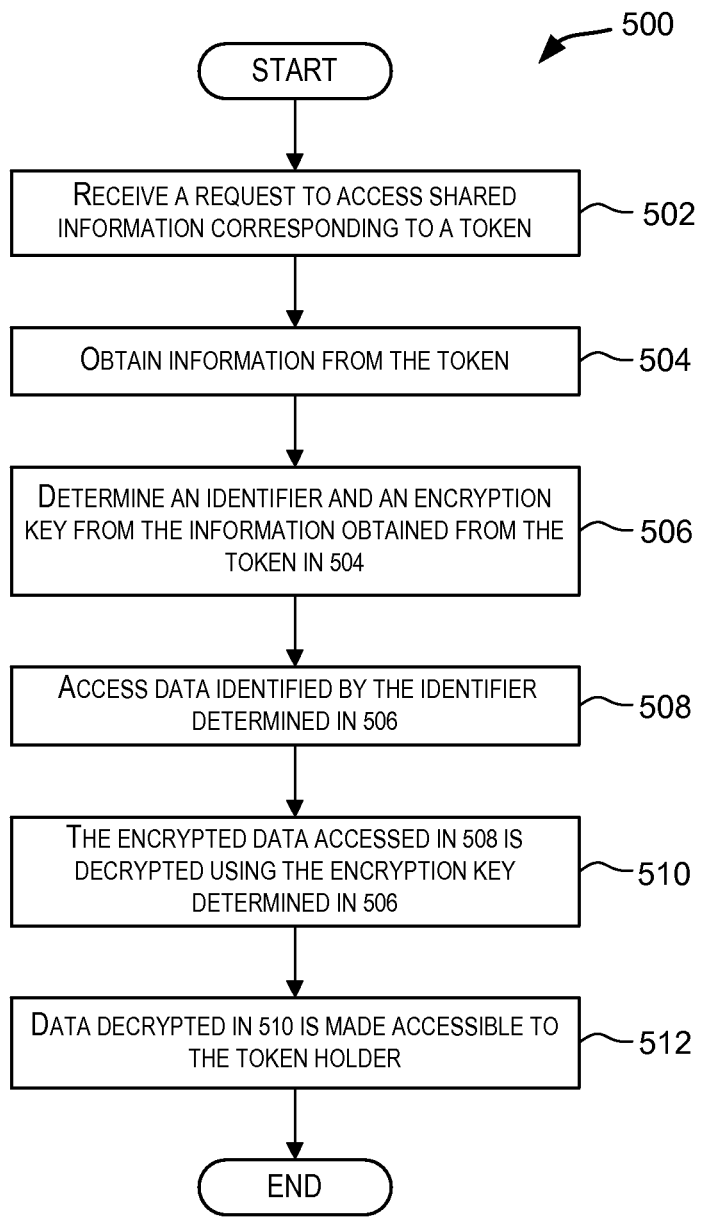
FIG. 5 is a simplified high-level flowchart depicting a method of using a generated token to access shared data according to an embodiment of the present invention.

A token that is generated, as described above, may also be used to access the shared information. FIG. 5 is a simplified high-level flowchart 500 depicting a method of using a generated token to access shared data according to an embodiment of the present invention. The method depicted in FIG. 5 may be performed by software modules (code modules or instructions) executed by a processor, hardware modules, or combinations thereof. For example, the method may be performed by token processor 102 depicted in FIG. 1. Flowchart 500 depicted in FIG. 5 is merely illustrative of an embodiment of the present invention and is not intended to limit the scope of the present invention. Other variations, modifications, and alternatives are also within the scope of the present invention. The method depicted in FIG. 5 may be adapted to work with different implementation constraints.

As depicted in FIG. 5, processing may be initiated upon receiving a request to access shared information corresponding to a token (step 502). In 502, a user wishing to access information using a token may present a token (either digital or physical) to a token reader such as token reader 114 depicted in FIG. 1. Information is then obtained from the presented token (step 504). The information obtained from the token includes information identifying an identifier and an encryption key associated with the token. The identifier and the encryption key associated with the token is then determined from the information obtained from the token in 504 (step 506). Data identified by the identifier determined in 506 is then accessed (step 508). As previously described, the identifier may be used to determine a storage location and the data at that storage location. The accessed data is typically in encrypted form. The encrypted data accessed from the storage location in 508 is then decrypted using the encryption key determined in 506 from the token (step 510). The decrypted data is then made accessible to the token holder (step 512). In this manner, a token may be used to gain access to data that has been encrypted and stored for sharing.

Figure 6:
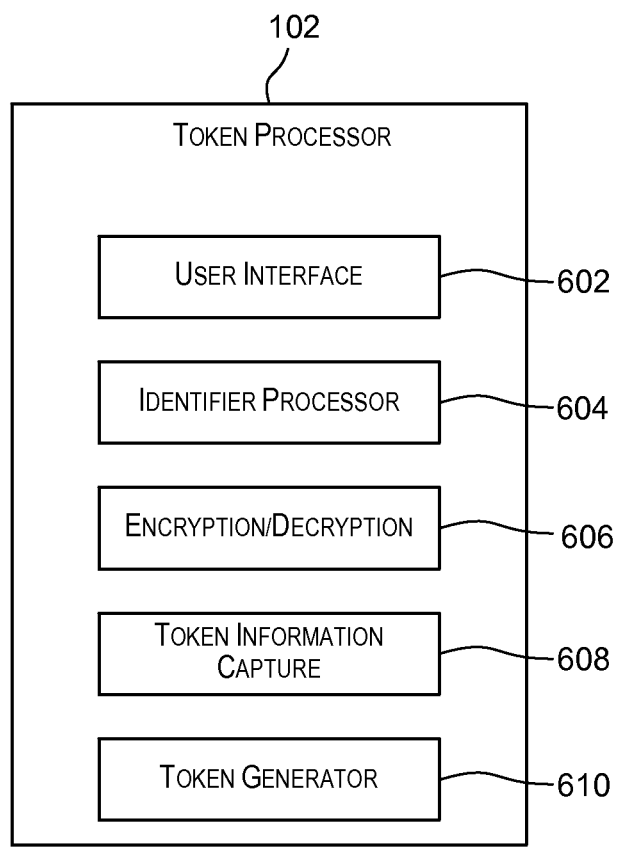
FIG. 6 depicts a simplified block diagram of various modules of a token processor according to an embodiment of the present invention.

As previously described, according to an embodiment of the present invention, token processor 102 facilitates generation and use of tokens. Token processor 102 may comprise several modules to perform the various tasks involved in generating and using tokens. FIG. 6 depicts a simplified block diagram of various modules of token processor 102 according to an embodiment of the present invention. As depicted in FIG. 6, token processor 102 may comprise a user interface module 602, an identifier processor module 604, an encryption/decryption module 606, a token information capture module 608, and a token generator module 610. The modules may be implemented in software (code or instructions executed by a processor), hardware, or combinations thereof.

User interface module 602 enables a user to interact with token processor 102. For example, user interface module 602 may provide interfaces that enable a user to request generation of new tokens, specify/identify information that is to be shared, request uploading of information to be shared using a token, request access to the shared information using a token, etc.

Token information capture module 608 may be configured to perform tasks related to capturing information from tokens and determining the identifier and encryption key information from the captured information. Token information capture module 608 may interface with a token reader and receive information captured by the token reader.

Identifier processor module 604 may be configured to perform tasks related to storing and accessing data from the storage location. These tasks may comprise determining or creating a storage location for storing data, generating an identifier for the storage location, determining a storage location corresponding to a given identifier, storing data to the storage location corresponding to an identifier, and accessing data from the storage location given an identifier.

Encryption/decryption module 606 may be configured to perform encryption and decryption-related tasks. These tasks may comprise determining/generating an encryption key to be associated with a token, encrypting the data to be shared using an encryption key, and decrypting encrypted data using an encryption key.

Token generator module 610 may be configured to perform tasks related to creation of digital or physical tokens. These tasks may comprise encoding the identifier and encryption key information in a machine-readable code and associating the code with a token, generating a digital token, generating a physical token using the services of a device such as a printer, etc.

As described above, tokens may be used to share data between a group of users. For example, a set of tokens may be generated in order to enable data sharing where each token in the set comprises the same identifier and the same encryption key. The data to be shared may or may not be identified at the time the tokens are generated. The generated tokens may then be distributed to a group of users who wish to share data. Any user from the group may subsequently use his/her token to share data with others in the group. As described above, by using the token, the data to be shared by the user is encrypted using the encryption key associated with his/her token and stored in a storage location corresponding to the identifier associated with his/her token. Since the tokens distributed to the other members of the group also contain the same identifier as the identifier that was used to store the data, any of the users in the group may use their tokens to access the shared data from the storage location, as described above. Further, since the encryption key associated with each distributed token is also the same and is a symmetric encryption key, the encryption key may be used to decrypt the shared data. In this manner, data may be shared among members of the group.

For example, a set of tokens may be generated for a conference, each token having the same identifier and symmetric encryption key associated with it. The set of tokens may then be distributed to attendees of the conference to enable them to share data amongst themselves. Any attendee may subsequently use his/her token to encrypt and upload data to the storage location corresponding to the identifier associated with the distributed tokens. Attendees may also access the data from the storage location using their tokens.

The data to be shared may also be identified when the tokens are generated and the data is encrypted using the encryption key (typically a symmetric encryption key) associated with the tokens and stored in a storage location corresponding to an identifier associated with the tokens. The generated tokens may then be distributed to a group of users who may then access the shared data using the tokens. Any of the users in the group may also load data to the storage location using the user's token and the data can then be accessed by other users who have tokens with the same identifier and the encryption key. In this manner, the tokens enable sharing of data between the users. Using the conference as an example, a presenter at the conference may, prior to the conference, identify data that is to be shared with attendees at the conference and generate a set of tokens, each with the same encryption key and identifier used to store the data to be shared by the presenter. The set of tokens may subsequently be distributed to attendees of the conference. Any attendee may subsequently use his/her token to access the data stored at the storage location. Any attendee may also encrypt and upload data to the storage location using the attendee's token. In this manner, the data is shared between the attendees and the presenter.

The creation of a token creates a storage location where data can be stored and subsequently accessed. The storage location is like a "drop box" where encrypted data may be stored or deposited and from which the encrypted data may be accessed. The identifier associated with a token may be used to identify the location of the "drop box". The encryption key associated with the token is sort of like the "key" to the drop box, where the key enables data to be "locked" (encrypted) in the drop box and also to unlock (decrypt) the data from the drop box.

Tokens, as described above, do not comprise any information about the users sharing the data. The identifier and encryption key associated with a token do not reveal anything about the identity of the users of the token. Accordingly, tokens enable data to be securely shared while maintaining the anonymity of the users of the token. Users in a group that have tokens with the same identifier and encryption key need not even know each other in order to share data. A user accessing the shared data may not know who uploaded the shared data. Tokens thus enable data to be shared anonymously among non-trusted third parties.

By providing a set of identical tokens to a group of users, all the users have access to the same identifier and the same encryption key. The identifier provides a pointer to the encrypted shared data and may be used to locate and identify the shared data and the encryption key may be used to encrypt and decrypt the shared data. The combination of the identifier and the encryption key allows users in the group to deposit and retrieve encrypted information anonymously, with minimal advance preparation.

Preferably, the identifier is globally unique and not guessable. Also, preferably, the identifier and the encryption key associated with a set of tokens is not stored in any other location but in the tokens themselves. Accordingly, only someone with access to a token can upload data to be shared to the storage location corresponding to the identifier associated with the token. Further, only someone with access to a token with the same identifier and encryption key can access the data from the stored location and decrypt the data. In this manner, the data is shared in a secure manner.

As described above, multiple tokens having the same identifier and the encryption key may be generated and distributed to a group of users. A user in the group may then use his/her token to load data to be shared or access the shared data. However, it is not essential that multiple tokens be generated. In one embodiment, a single token may be generated that may be used by multiple users (or a single user) who want to load data to be shared or access the shared data.

Figure 7A:
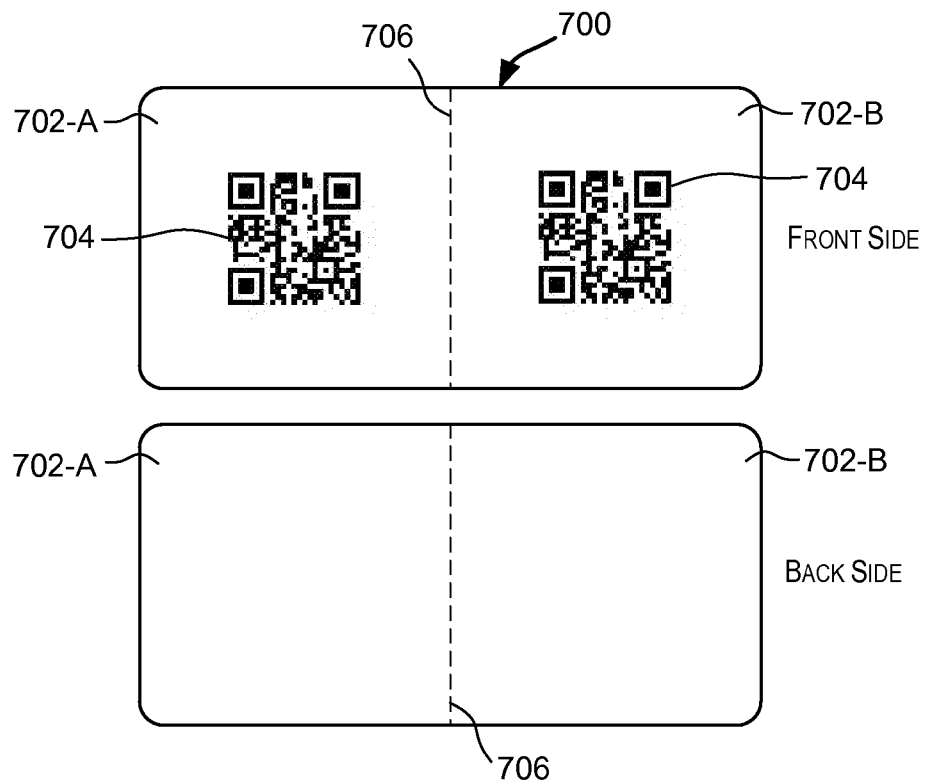
FIGS. 7A and 7B depict examples of tokens that may be generated according to embodiments of the present invention.
Figure 7B:
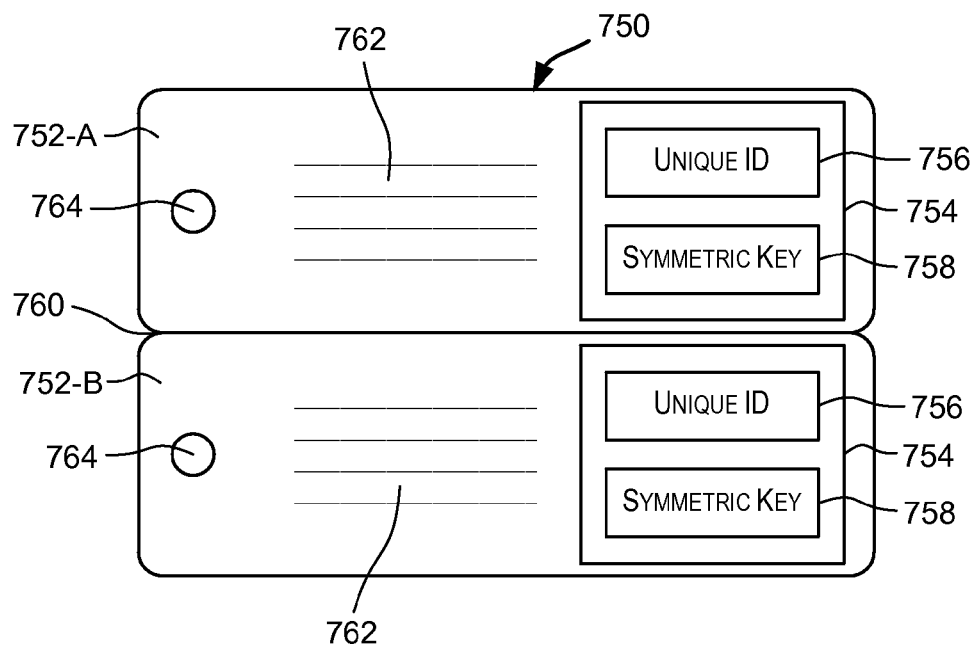

FIGS. 7A and 7B depict examples of tokens that may be generated according to embodiments of the present invention. As shown in FIG. 7A, a card 700 (or paper or plastic or other physical medium) may be generated which has two identical tokens 702-A and 702-B. Each token comprises a barcode (QR code) 704 encoding a unique identifier and a symmetric encryption key. Card 700 may be perforated along line 706 to enable the card to be broken or snapped into two physically separate tokens, each with a QR code. Upon breaking the card, token 702-A may be given to a first user and token 702-B may be given to a second user who wishes to share data with the first user. For example, the first user may use token 702-A to encrypt and upload data to a storage location from where it can be accessed by the second user using token 702-B. Either user may deposit data to be shared and access the shared data using their token since both tokens 702-A and 702-B have the same identifier and symmetric encryption key. By providing a pair of identical tokens to two individuals, both have access to the same unique identifier and the same encryption key. The combination of the identifier and the encryption key allows them to deposit and retrieve encrypted data anonymously, with minimal advance preparation. In alternative embodiments, a card may be created with several tokens which may be broken into separate physical tokens.

FIG. 7B depicts another card 750 comprising two identical tokens 752-A and 752-B. Each token comprises information 754 encoding a unique identifier 756 and a symmetric encryption key 758. Card 750 may be snapped along line 760 to create two independent physically separate tokens which may then be provided to different users. Each token also comprises space 762 that is provided for markup by a user of the token. For example, the user may write a description of the data that is shared using the token. Each token also comprises a keyhole that enables the token to be attached to a keychain for convenient portability.

As previously described, a symmetric key may be associated with tokens such that the same key is used for encrypting and decrypting information using the tokens. In alternative embodiments, a key pair may be used, such as a Public/Private key pair. In such embodiments, data may be encrypted using the public key and may be decrypted only using the private key of the pair which is kept secret. A card such as card 700 depicted in FIG. A may be created having non-identical tokens 702-A and 702-B. The machine-readable code associated with token 702-A may encode a unique identifier and the public key of the public/private key pair and the machine-readable code associated with token 702-B may encode the same unique identifier as token 702-A and the private key from the public/private key pair. Token 702-A may then be provided to a user who is allowed to encrypt the shared data using the public key and upload the information to be shared to a storage location corresponding to the identifier and token 702-B may be provided to a user who is allowed to access the shared information from the storage location and decrypt it using the private key. In another embodiment, both the keys in a pair may be printed on a token. For example, two machine-readable codes may be printed on a token, one encoding the identifier and the public key of the public/private key pair and another encoding the identifier and the private key of the public/private key pair. One machine-readable code may be printed on one side of the token and the other on the other side.

Public/Private key encryption generally works symmetrically. In other words, when data is encrypted with the so-called public key, it can only be decrypted using the private key. Alternatively, when data is encrypted using the private key, it can only be decrypted using the public key. In other words if a pair of public/private keys are used in an embodiment of this invention, each user will be able to provide data encrypted in a way that can only be accessed by the other user and not by themselves.

In another embodiment, instead of the tokens comprising the keys from the key pairs, each token in a set of tokens comprises an identifier, a symmetric encryption key, and information that points to an encrypted public/private key pair. Holders of tokens in the set may access the same pair of keys using the token. The encrypted key pair may be decrypted using the symmetric key associated with a token. Each token holder could use the public key of the key pair to encrypt the data and the private key of the key pair to retrieve it. In this embodiment, the symmetric key associated with a token is only used for decrypting the public/private key pair. In this embodiment, the private key can be used to encrypt documents that are stored at the storage location. The public key and document identifier could be given out to other users who can read and decrypt all the documents, but not add new documents. Only those with the symmetric key have access to the private key and can upload new encrypted documents.

In alternative embodiments, the token holders may choose a secret password and the data being shared may be encrypted using that password also so that a person would have to have access to both the token comprising the identifier and the encryption key and the password in order to access the shared data.

According to an embodiment of the present invention, in addition to storing encrypted shared data, metadata associated with the shared data may also be stored. The metadata may be stored in encrypted form. The metadata may comprise information related to the shared data such as mimetype for the shared object, tags related to the shared data, and pointers to next and previous versions of the data. The metadata may be accessed using the document identifier at the same storage location by requesting the metadata instead of requesting the document.

For example, in one embodiment, the shared data may be stored in a document that is encrypted using an encryption key and then stored in a location from where it can be shared. A cryptographic hash (e.g., a 128-bit cryptographic hash) may be calculated from the encrypted document bits and the hash may serve as the unique identifier. The encrypted document is then stored using the hash as the identifier. Metadata associated with the document is also encrypted and stored along with the document. One or more tokens may be generated comprising the hash identifier and the encryption key used to encrypt the document.

When a token comprising the hash identifier and the encryption key is used to upload a new version of the shared information, a new document is created comprising the shared data and the new document is encrypted using the encryption key. A new hash identifier is then calculated for the encrypted new document and the new document is stored using the new identifier. This newly computed identifier is added to the metadata of the previously stored document as the "next" version of the document. It is convenient to use the same encryption key to encrypt all versions of a document so that a person with the original token can follow the "next" pointers using the metadata of the stored document versions until the person finds the most recent known version of the document or the version the person is looking for. The encryption key may be used to decrypt the latest encrypted document version.

In one embodiment, the first version of the encrypted document may act as a placeholder either containing no information or information such as something about who created the document. Regardless of the contents of the data in the first version of the document, the identifier for the document is calculated in a way that it is unique. For instance, the identifier may be calculated as a cryptographic hash of the chosen encryption key concatenated with the date and time and an additional random string. One or more identical tokens may then be generated comprising the calculated identifier and the encryption key.

A person wishing to upload data to be shared may use a token which causes the shared data to be encrypted using the encryption key from the token, a new identifier is calculated based upon the encrypted data to be shared, the encrypted data is stored corresponding to the new identifier, and the new identifier is added as the "next" pointer (or one of the next pointers) in the metadata associated with the original identifier that is associated with the token and which points to an initial placeholder document. A person wishing to access shared data may use a token comprising the same identifier (i.e., the original identifier) and the encryption key which causes an application (such as token processor 102 depicted in FIG. 1) to use the original identifier read from the token to access the placeholder document and its metadata, follow the "next" pointer in the metadata to access the desired encrypted version of the shared document. The desired encrypted version may then be accessed and decrypted using the encryption key read from the token.

Figure 8:
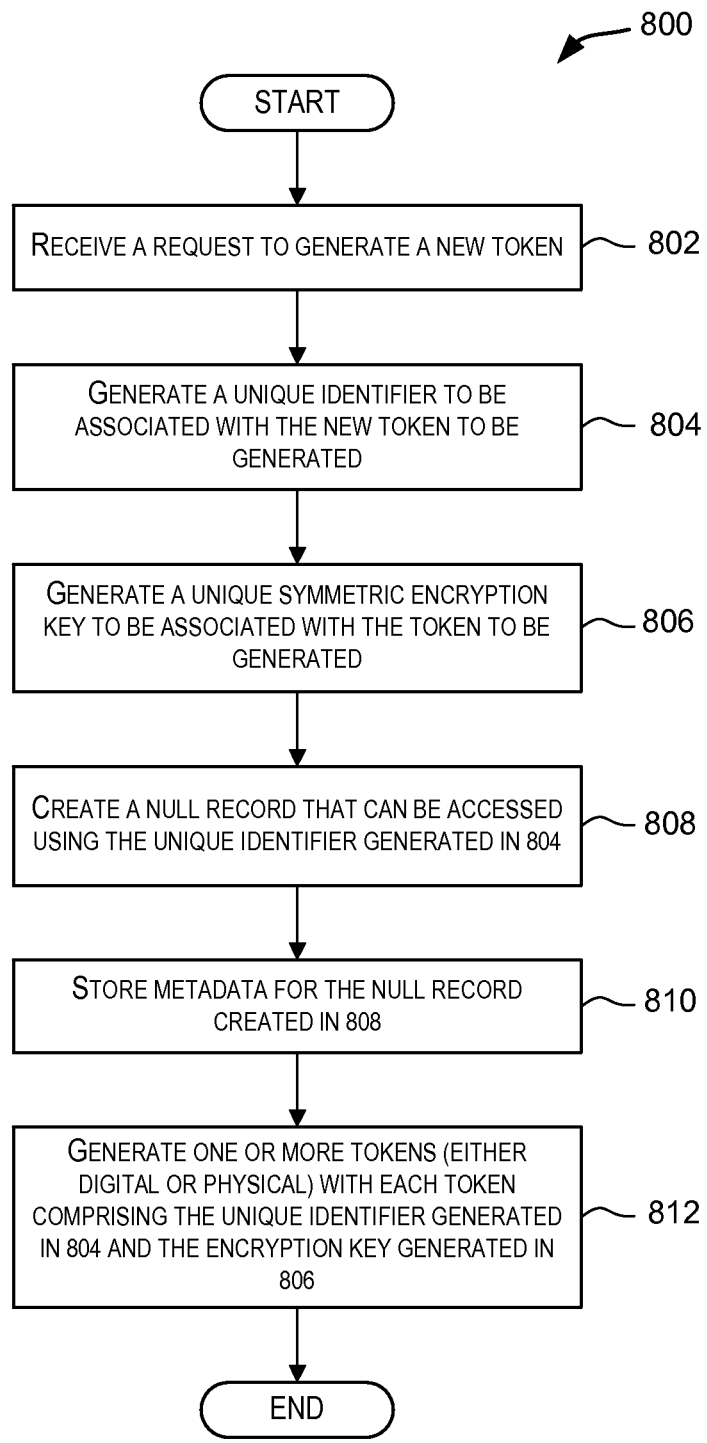
FIG. 8 is a simplified high-level flowchart depicting a method of generating a token to share data in an embodiment where different versions of the shared data may be stored.

FIG. 8 is a simplified high-level flowchart 800 depicting a method of generating a token to share data in an embodiment where different versions of the shared data may be stored. The method depicted in FIG. 8 may be performed by software modules (code modules or instructions) executed by a processor, hardware modules, or combinations thereof. For example, the method may be performed by token processor 102 depicted in FIG. 1. Flowchart 800 depicted in FIG. 8 is merely illustrative of an embodiment of the present invention and is not intended to limit the scope of the present invention. Other variations, modifications, and alternatives are also within the scope of the present invention. The method depicted in FIG. 8 may be adapted to work with different implementation constraints.

As depicted in FIG. 8, processing may be initiated upon receiving a request to generate a new token (step 802). A unique identifier may then be generated to be associated with the token to be generated (step 804). The identifier generated in 804 is such that it can be used to identify and access the shared data. In one embodiment, the identifier may be calculated as the hash of a random stream of data generated by a random number generator. Other techniques may also be used to generate a unique identifier in 804. A unique symmetric encryption key is also created to be associated with the token to be generated (step 806).

A null record is then created that can be accessed using the unique identifier generated in 804 (step 808). The null record may be a document that is created. Metadata is also stored for the null record created in 808 (step 810). The metadata may comprise information pointing to the next version of the shared data. For example, the metadata may comprise "next" information that may be used to point to a next version of the shared data. Since initially there is no shared data stored, the metadata "next" pointer of the null record is set to null. In one embodiment, the metadata is encrypted using the encryption key generated in 806 and the encrypted metadata is stored.

One or more tokens (either digital or physical) are then generated, with each token comprising the unique identifier generated in 804 and the encryption key created in 806 (step 812). As previously described, different techniques may be used for associating the identifier and encryption key information with a token. For example, a QR code may be created encoding the unique identifier and encryption key and the QR code may be associated (e.g., printed) with each token (digital or physical). Physical tokens may be created in various forms including the examples depicted in FIGS. 7A and 7B. The tokens generated in 812 may then be distributed to a group of users wishing to share data. A user from the group may use the token to either load the data to be shared or to access the shared data.

The null record that is created acts a placeholder that may be used to store and access different versions of the shared data. When shared data is uploaded for the first time using the token (i.e., the first version of shared data), the first version is encrypted using the encryption key from the token. The encrypted first version of the shared data is stored in a newly created record. A new identifier is generated for the new record such that the new record is accessible using the generated identifier. Metadata information is stored for the newly created record. The metadata information may be encrypted using the encryption key associated with the token. The "next" pointer in the metadata associated with the null record is changed to point to the new record. This may be done in one embodiment by setting the "next" information in the metadata of the null record to the newly generated identifier for the new record. The new identifier thus provides a link or pointer to the new record. The "next" pointer in the metadata associated with the new record is set to null. In this manner, a sort of linked list is created with the null record being the first node in the list and the uploaded version (which is the "latest" version) being stored in the record pointed to by the metadata of the null record. As newer versions of the shared data are uploaded, a new record is created for each new added version, a new identifier calculated for the newly created record, and the "next" information in the metadata associated with the record storing the previous uploaded version is set to the newly calculated identifier thereby creating a pointer from the record storing the previous version to the record storing the latest version. The last record in the linked list stores the latest version of the shared data.

A token may then be used to access the latest version of the stored data. A token enables access to the first record in the linked list (i.e., the null record) and the metadata pointers may then be used to traverse the linked list of records to the last record storing the latest version of the shared data. The latest version data may then be accessed and decrypted using the encryption key from the token.

In one embodiment a collection of data may be stored at the identifier by storing a list of document identifiers in the metadata of the original identifier in the token instead of a linked list. For example, every time a user wishes to share a new document, the document is encrypted using the encryption key on the token and then a new document identifier is calculated or created. The encrypted document is uploaded to the location specified by the new identifier. The new identifier is then added to the list of document identifiers stored in the metadata of the identifier in the token. The identifiers in the collection can be encrypted using the encryption key in the token also.

Figure 9:
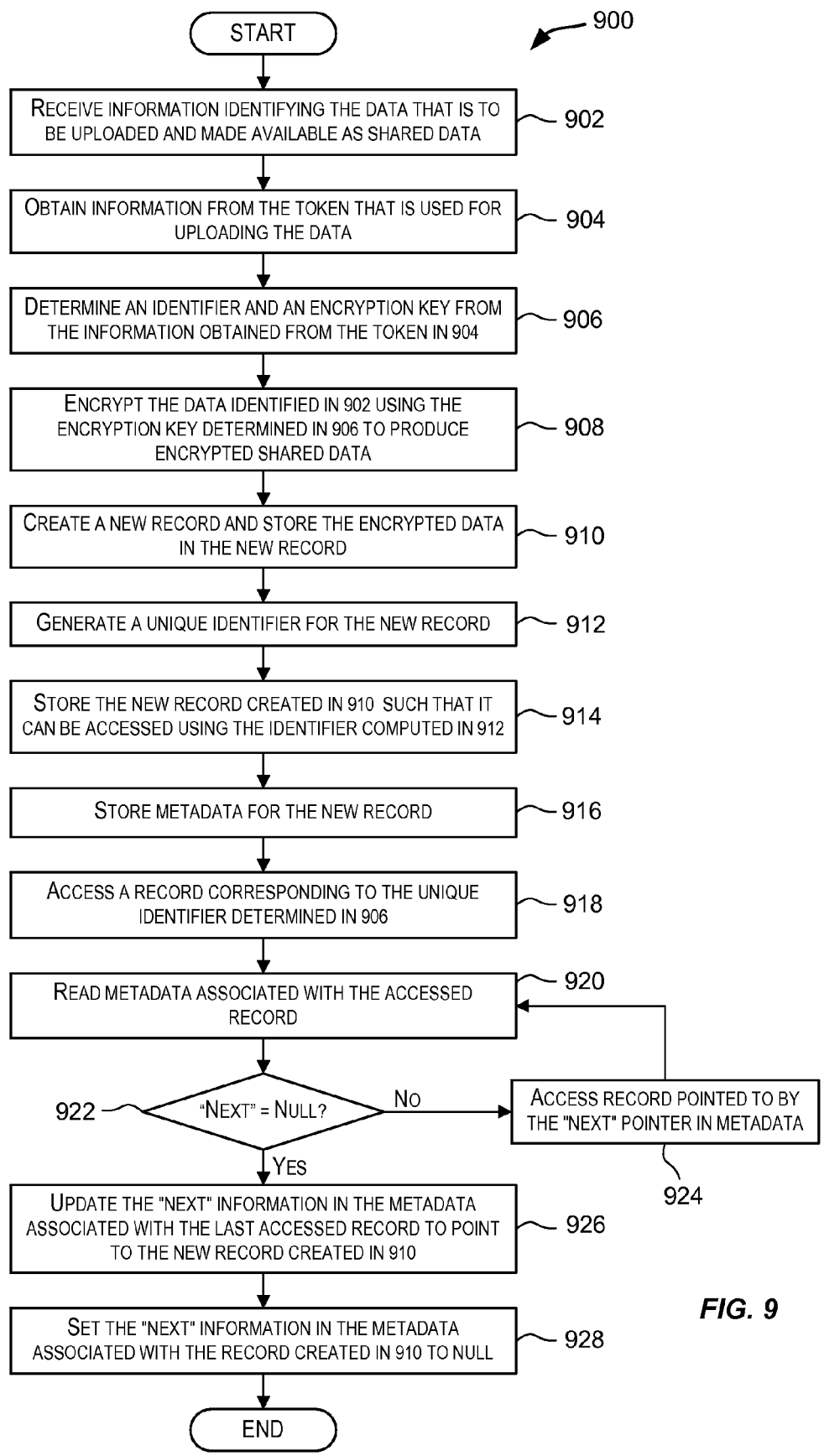
FIG. 9 is a simplified high-level flowchart depicting a method of using a token to upload data to be shared in an embodiment where different versions of the shared data may be stored.

FIG. 9 is a simplified high-level flowchart 900 depicting a method of using a token to upload data to be shared in an embodiment where different versions of the shared data may be stored. The method depicted in FIG. 9 may be performed by software modules (code modules or instructions) executed by a processor, hardware modules, or combinations thereof. For example, the method may be performed by token processor 102 depicted in FIG. 1. Flowchart 900 depicted in FIG. 9 is merely illustrative of an embodiment of the present invention and is not intended to limit the scope of the present invention. Other variations, modifications, and alternatives are also within the scope of the present invention. The method depicted in FIG. 9 may be adapted to work with different implementation constraints.

As depicted in FIG. 9, information may be received identifying the data that is to be uploaded and made available as shared data (step 902). Information is obtained from the token that is used for uploading the data (step 904). For example, the machine-readable code associated with the token may be read by a token reader in 904. An identifier and an encryption key is then determined from the information obtained from the token in 904 (step 906).

The data identified in 902 is encrypted using the encryption key determined in 906 to produce encrypted shared data (step 908). A new record is then created and the encrypted data is stored in the newly created record (step 910). The new record may be a document storing the encrypted shared data. A new unique identifier is then computed for the new record created in 910 (step 912). In one embodiment, the unique identifier may be generated by calculating a cryptographic hash of the encrypted contents of the new record. The new record created in 910 is stored such that it can be accessed using the identifier computed in 912 (step 914). Metadata is stored for the new record (step 916).

Processing is then performed to upload the new record storing the encrypted new shared data. A record corresponding to the unique identifier determined in 906 (i.e., the identifier obtained from the token) is then accessed (step 918). The record may be in the form of a document that is pointed to by the unique identifier. Metadata associated with the accessed record is read (step 920). In one embodiment, the metadata may be encrypted and the encryption key determined from the token in 906 may be used to decrypt the metadata.

A check is then made to see if the "next" information included in the accessed metadata is null or whether it points to another stored record (step 922). If the "next" pointer is null, then it indicates that the last record in the linked list of records has been reached. This last record stores the last uploaded version of the shared data. If the "next" pointer is not null, then it indicates that the last record in the linked list has not been reached and the linked list of records is traversed until the last record is reached.

Accordingly, if it is determined in 922 that the "next" information in the metadata is not null, then the record pointed to by the "next" pointer is accessed (step 924). In one embodiment, the "next" information identifies an identifier that is used to identify and access a record. Processing then reverts to 920 wherein metadata associated with the newly accessed record is read. According to 922, a check is made to see if the null pointer associated with the accessed metadata is set to null. In this manner, steps 920, 922, and 924 are repeated until the last record has been reached (i.e., a record with metadata having the "next" information set to null).

Once the last record has been reached, the "next" information in the metadata associated with the last record is updated to point to the new record created in 910 (step 926). This may be achieved by setting the "next" information of the metadata of the last accessed record to the new identifier calculated in 912. In this way, the "next" information points to the new record. The "next" information in the metadata associated with the newly created record is set to null (step 928) thereby indicating that it is now the last record in the linked list of records and stores the latest version of the data. The metadata associated with the record may be encrypted using the encryption key obtained from the token. Information identifying a version may also be stored in the metadata associated with the newly created record.

In the manner described above, a new record is created and added each time a new version of shared data is uploaded using a token comprising a particular identifier and encryption key. The uploads may be performed by different users. The uploads may be performed using the same token or different token (all having the same identifier and encryption key). Those familiar with database operations and version control systems will recognize that it is important that two different users do not try to update the next pointer in the metadata of the same record simultaneously. In other words, both users may be trying to upload a new version of a document simultaneously and find the same null pointer and both change the null pointer to different identifiers at the same time. When this happens, the last user to write the change wins and the first user's changes are lost. There are a number of ways well known in the art to avoid such a collision including atomic operations or write-locking. For instance, if the operation of testing for a null pointer and updating it to a new identifier value was an atomic operation that happened in one step then no two users could test and update simultaneously. In one embodiment, multiple next pointers could be allowed in the linked list. Even though this would allow the document versions to branch, this might be more acceptable than losing a document altogether.

Figure 10A:
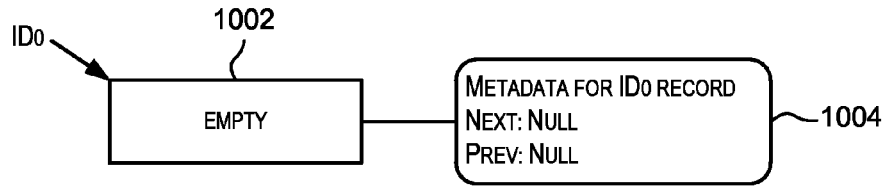
FIGS. 10A, 10B, and 10C depict progression of a linked list of records as newer versions of shared data are uploaded using a token according to an embodiment of the present invention.
Figure 10B:
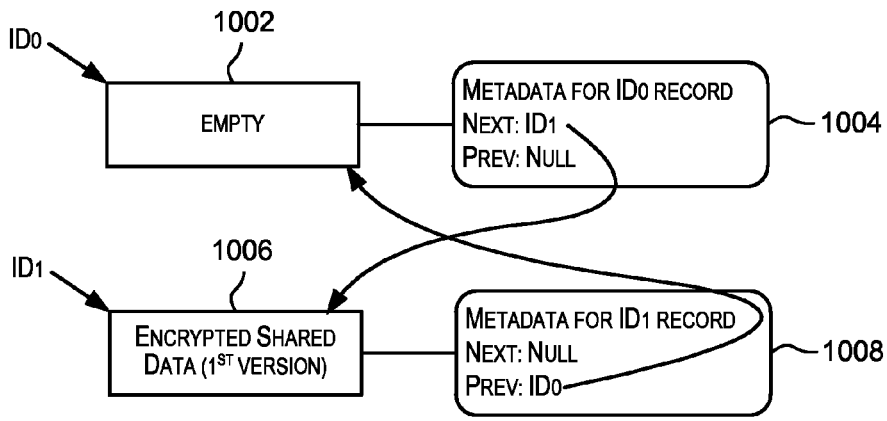
Figure 10C:
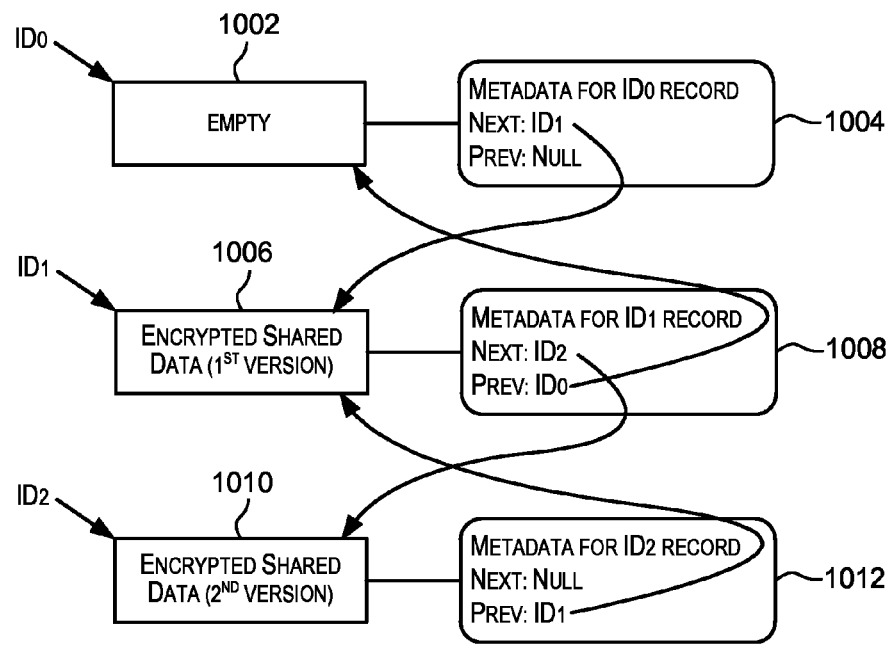

FIGS. 10A, 10B, and 10C depict progression of a linked list of records as newer versions of shared data are uploaded using a token according to an embodiment of the present invention. As depicted in FIG. 10A, when a token is first created, an empty record 1002 may be created corresponding to the identifier (ID0) associated with the token. In some embodiments, record 1002 may not be empty but may hold information such as when the record was created, who created the record, etc. Metadata 1004 for empty record 1002 is also stored comprising "next" information and "prev" information. The "next" is used for pointing to the next record in the record list and the "prev" is used for pointing to the previous record in the list. The "next" information and the "prev" information are set to null.

FIG. 10B depicts the list of records when a first version of shared data has been uploaded using a token comprising the same identifier and encryption key that was used to create the record in 10A. The first version is encrypted using the encryption key read from the token. A new record 1006 is created for storing the encrypted data. A new identifier (ID1) is created for new record 1006. Metadata 1008 is also stored for new record 1006. The "next" in metadata 1004 associated with record 1002 is set to ID1, thereby pointing to new record 1006. The "next" in metadata 1008 associated with new record 1006 is set to null. The "prev" in metadata 1008 is set to ID0, thereby pointing to the previous record 1002 in the list of records. Record 1006 now stores the latest version of the shared data uploaded using a token in encrypted form.

FIG. 10C depicts the list of records when a second version of shared data has been uploaded using a token. The second version is encrypted using the encryption key read from the token. A new record 1010 is created for storing the encrypted data. A new identifier (ID2) is created for new record 1010. Metadata 1012 is also stored for new record 1010. The "next" in metadata 1008 associated with record 1006 is set to ID2, thereby pointing to new record 1010. The "next" in metadata 1012 associated with new record 1010 is set to null. The "prev" in metadata 1012 is set to ID1, thereby pointing to the previous record 1006 in the list of records. Record 1010 now stores the latest version of the shared data uploaded using a token in encrypted form.

In this manner, multiple versions of shared data may be uploaded using tokens having the same identifier and encryption key. In one embodiment, information identifying a particular version of shared data stored by a record may also be stored in the metadata associated with that record.

Figure 11:
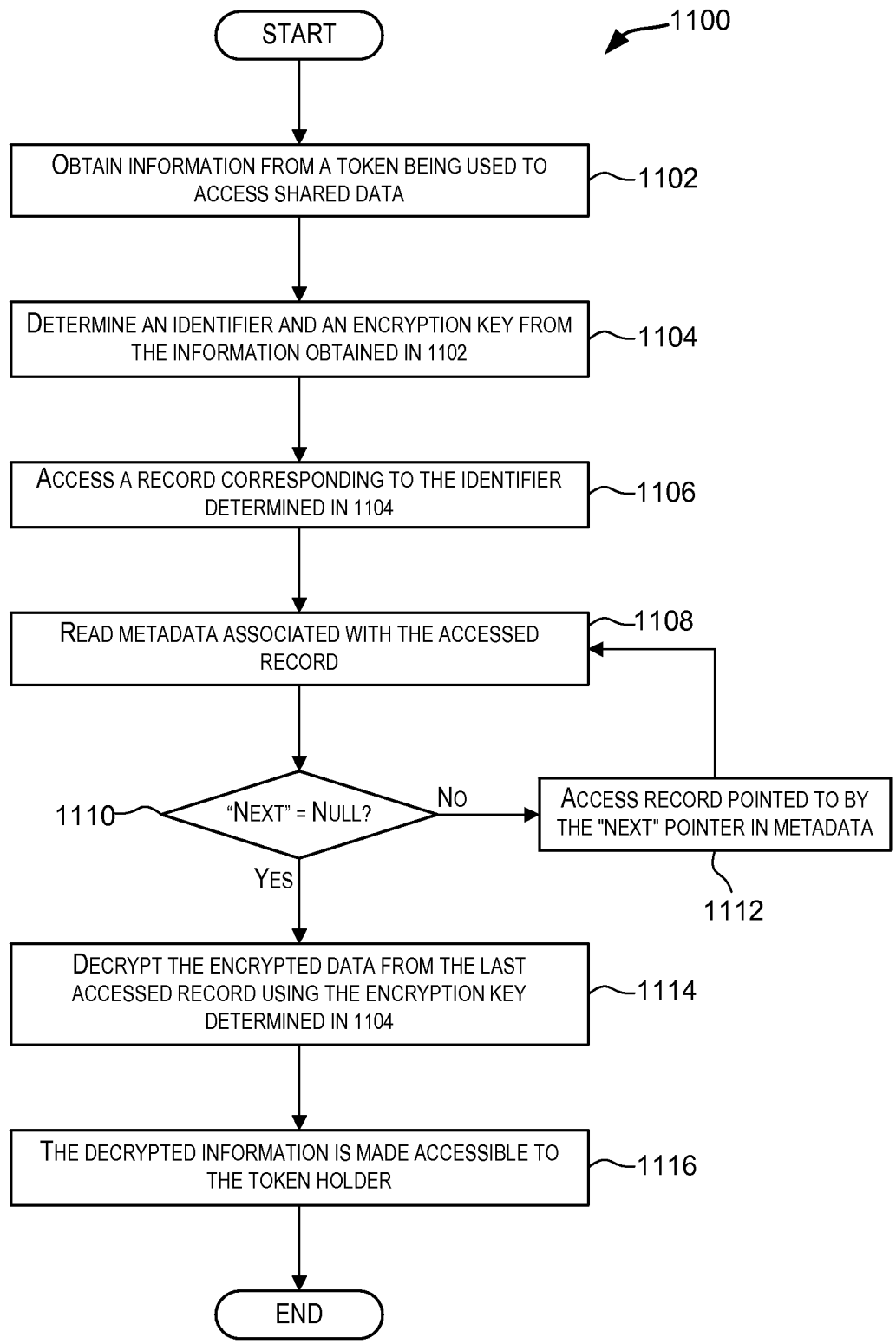
FIG. 11 is a simplified high-level flowchart depicting a method of using a token to access the latest version of shared data according to an embodiment of the present invention.

A token may also be used to access the latest version of shared data. FIG. 11 is a simplified high-level flowchart 1100 depicting a method of using a token to access the latest version of shared data according to an embodiment of the present invention. The method depicted in FIG. 11 may be performed by software modules (code modules or instructions) executed by a processor, hardware modules, or combinations thereof. For example, the method may be performed by token processor 102 depicted in FIG. 1. Flowchart 1100 depicted in FIG. 11 is merely illustrative of an embodiment of the present invention and is not intended to limit the scope of the present invention. Other variations, modifications, and alternatives are also within the scope of the present invention. The method depicted in FIG. 11 may be adapted to work with different implementation constraints.

As depicted in FIG. 11, information may be obtained from a token being used to access shared data (step 1102). An identifier and an encryption key are determined from the information obtained in 1102 (step 1104). A record corresponding to the unique identifier determined in 1102 is accessed (step 1106). Metadata associated with the accessed record is read (step 1108). In one embodiment, the metadata may be encrypted and the encryption key determined from the token in 1102 may be used to decrypt the metadata.

A check is then made to see if the "next" information included in the accessed metadata is null or whether it points to another stored record (step 1110). If the "next" pointer is null, then it indicates that the last record has been reached. This last record stores the last uploaded version of the shared data. If the "next" pointer is not null, then it indicates that the last record in the linked list has not been reached and the linked list of records is traversed until the last record is reached. Accordingly, if it is determined in 1110 that the "next" information in the metadata is not null, then the record pointed to by the "next" pointer is accessed (step 1112). In one embodiment, the "next" information identifies an identifier that points to a record that is then accessed. Processing then reverts to step 1108 wherein metadata associated with the accessed record is read. According to 1110, a check is made to see if the null pointer associated with the accessed metadata is set to null. In this manner, steps 1108, 1110, and 1112 are repeated until the last record has been reached (i.e., the "next" information in the metadata associated with the record is set to null).

The last record stores the latest version of the shared data in encrypted form. The encrypted data from the last record is decrypted using the encryption key determined in 1104 (step 1114). The decrypted information is then made accessible to the token holder wishing to access the information (step 1116).

In the embodiments described above, the identifier information stored in the metadata associated with a record may be encrypted using the encryption key associated with a token. During processing, this information may be decrypted using the encryption key read from the token. In one embodiment, all encryptions may be performed using a symmetric key associated with a token. The symmetric key may then be also used to perform all decryptions.

Optionally, two token holders may agree upon a password and the password may be used as an additional layer of security. In this embodiment, in addition to the identifier and the encryption key, the password is also required in order to access shared data.

Figure 12:
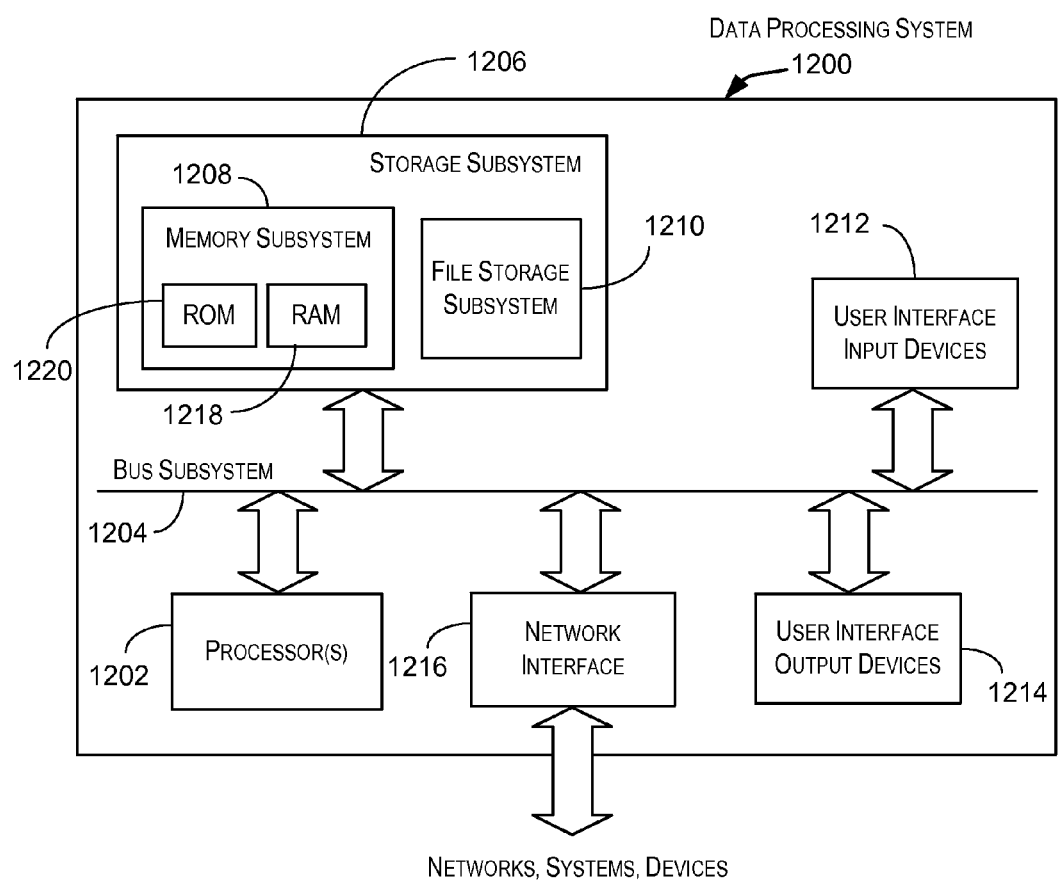
FIG. 12 is a simplified block diagram of a data processing system that may be used to used to perform processing according to an embodiment of the present invention.

FIG. 12 is a simplified block diagram of a data processing system 1200 that may be used to used to perform processing according to an embodiment of the present invention. For example, data processing system 1200 may serve as computer system 104 depicted in FIG. 1. As shown in FIG. 12, data processing system 1200 includes a processor 1202 that communicates with a number of subsystems via a bus subsystem 1204. These subsystems may include a storage subsystem 1206, comprising a memory subsystem 1208 and a file storage subsystem 1210, user interface input devices 1212, user interface output devices 1214, and a network interface subsystem 1216.

Bus subsystem 1204 provides a mechanism for letting the various components and subsystems of computer system 1200 communicate with each other as intended. Although bus subsystem 1204 is shown schematically as a single bus, alternative embodiments of the bus subsystem may utilize multiple busses.

Network interface subsystem 1216 provides an interface to other computer systems, networks, and devices. Network interface subsystem 1216 serves as an interface for receiving data from and transmitting data to other systems from data processing system 1200. For example, a digital token may be communicated to and from data processing system 1200 using network interface subsystem 1216. Embodiments of network interface subsystem 1216 typically include an Ethernet card, a modem (telephone, satellite, cable, ISDN), (asynchronous) digital subscriber line (DSL) unit, FireWire interface, USB interface, and the like. For example, interface 1216 may be coupled to a computer network, to a FireWire bus, or the like. In other embodiments, interfaces 1216 may be physically integrated on the motherboard of data processing system 1200, may be a software program such as soft DSL, or the like.

User interface input devices 1212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to data processing system 1200. A user may perform tasks such as identifying data to be shared, generating request, etc. using input devices 1212.

User interface output devices 1214 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from data processing system 1200. A digital token may be displayed via an output device 1214.

Storage subsystem 1206 may be configured to store the basic programming and data constructs that provide the functionality of the present invention. Software (code modules or instructions) that when executed by a processor provide the functionality of the present invention may be stored in storage subsystem 1206. These software modules or instructions may be executed by processor(s) 1202. Storage subsystem 1206 may also provide a repository for storing data used in accordance with the present invention. For example, digital tokens may be stored by storage subsystem 1206. Storage subsystem 1206 may comprise memory subsystem 1208 and file/disk storage subsystem 1210.

Memory subsystem 1208 may include a number of memories including a main random access memory (RAM) 1218 for storage of instructions and data during program execution and a read only memory (ROM) 1220 in which fixed instructions are stored. File storage subsystem 1210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Data processing system 1200 can be of various types including a personal computer, a portable computer, a workstation, a network computer, a mainframe, a kiosk, or any other data processing system. Due to the ever-changing nature of computers and networks, the description of data processing system 1200 depicted in FIG. 12 is intended only as a specific example for purposes of illustrating the preferred embodiment of the computer system. Many other configurations having more or fewer components than the system depicted in FIG. 12 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method of sharing data, the method comprising:
   generating a first physical token and a second physical token, each of the first and the second physical tokens comprising an identifier and an encryption key, wherein the identifier is associated with a location for storing encrypted data,
   after generating the first and the second physical tokens, receiving, by one of one or more computer systems, information identifying data to be shared;
   receiving, by the one of the one or more computer systems, information read from the first physical token, the information comprising the identifier and the encryption key;
   encrypting, by the one of the one or more computer systems, the data to be shared using the encryption key read from the first physical token to generate encrypted data;
   causing, by the one of the one or more computer systems, the encrypted data to be stored using the identifier;
   obtaining the identifier and encryption key from the second physical token;
   accessing the encrypted data using the identifier obtained from the second physical token;
   decrypting the encrypted data using the encryption key obtained from the second physical token to produce decrypted data; and
   enabling access to the decrypted data.

2. The method of claim 1 further comprising generating the identifier, wherein generating the identifier comprises:
   determining the location for storing encrypted data; and
   generating the identifier based upon the location for storing encrypted data.

3. The method of claim 1 wherein generating the first physical token and the second physical token comprises:
   generating a machine-readable code encoding the identifier and the encryption key; and
   associating the machine-readable code with the first physical token and the second physical token.

4. The method of claim 1 wherein at least one of the first physical token or the second physical token comprises a machine-readable code encoding the identifier and the encryption key.

5. The method of claim 1 wherein generating the first physical token and the second physical token comprises printing the first physical token and the second physical token on a single physical medium, wherein the single physical medium enables a token printed on the single physical medium to be physically separated from other tokens printed on the single physical medium.

6. A method of sharing data, the method comprising:
   receiving, by one of one or more computer systems, an encryption key and an identifier, wherein the encryption key and the identifier are read from a first physical token, and the identifier is associated with a location for storing encrypted data;
   receiving, by the one of the one or more computer systems, data to be shared;
   encrypting, by the one of the one or more computer systems, the data using the encryption key to produce encrypted data; and
   causing, by the one of the one or more computer systems, the encrypted data to be stored such that the encrypted data is accessible using the identifier;
   obtaining information from a second physical token by reading machine readable information disposed on the second physical token, the second physical token comprising the identifier and the encryption key;
   determining the identifier and encryption key from the information obtained from the second physical token;
   accessing the encrypted data using the identifier determined from the information obtained from the second physical token;
   decrypting the encrypted data using the encryption key determined from the information obtained from the second physical token to produce decrypted data; and
   enabling access to the decrypted data,
   wherein the first physical token and the second physical token are generated prior to receiving the data.

7. A system of sharing data, the system comprising:
   a memory configured to store data to be shared; and
   one or more processors configured to:
      cause generation of a first physical token and a second physical token, each of the first physical token and the second physical token comprising an identifier and an encryption key, wherein the identifier is associated with a location for storing encrypted data;
   receive information identifying the data to be shared;
   receive information read from the first physical token;
   encrypt the data to be shared using the encryption key read from the first physical token to generate encrypted data;
   cause the encrypted data to be stored in the memory at a memory location accessible using the identifier read from the first physical token;
   obtain the identifier and encryption key from the second physical token by analyzing information encoded in a machine-readable code disposed on the second physical token;
   access the encrypted data using the identifier obtained from the second physical token;
   decrypt the encrypted data using the encryption key obtained from the second physical token to produce decrypted data; and
   enable access to the decrypted data;
   wherein the first and the second physical tokens are generated prior to the processor receiving the information identifying the data to be shared.

8. The system of claim 7 wherein at least one of the first physical token or the second physical token comprises a machine-readable code encoding the identifier and the encryption key.

9. The system of claim 7 further comprising a printer configured to print the first physical token and the second physical token on a single physical medium, wherein the single physical medium enables the first physical token printed on the single physical medium to be physically separated from the second physical token printed on the single physical medium.

10. A method comprising:
   generating a first physical token and a second physical token, each of the first and the second physical tokens comprising machine readable information, the machine readable information including an identifier and an encryption key, wherein the identifier is associated with a location for storing encrypted data;
   receiving, by one of one or more computer systems, information identifying data to be shared;

reading, by the one of the one or more computer systems, the machine readable information from the first physical token;
determining, by the one of the one or more computer systems, the identifier and the encryption key from the machine readable information read from the first physical token;
encrypting, by the one of the one or more computer systems, the data using the encryption key to generate encrypted data;
causing, by the one of the one or more computer systems, storage of the encrypted data at a location specified by the identifier;
obtaining the identifier and encryption key from the second physical token by analyzing the machine readable information from the second physical token;
accessing the encrypted data using the identifier obtained from the second physical token;
decrypting the encrypted data using the encryption key obtained from the second physical token to produce decrypted data; and
enabling access to the decrypted data,
wherein the first and the second physical tokens are generated prior to receiving the information identifying the data.

* * * * *